(12) United States Patent
Yu et al.

(10) Patent No.: US 9,931,570 B1
(45) Date of Patent: Apr. 3, 2018

(54) DOUBLE OR NOTHING VIRTUAL CONTAINERS

(71) Applicant: Aftershock Services, Inc., San Ramon, CA (US)

(72) Inventors: Christopher Yu, San Francisco, CA (US); Inyang Akpan, San Francisco, CA (US); David McNeill, San Francisco, CA (US); Wynne Chyou, San Francisco, CA (US); Kevin Lee, Fremont, CA (US)

(73) Assignee: Aftershock Services, Inc., San Ramon, CA (US)

( * ) Notice: Subject to any disclaimer, the term of this patent is extended or adjusted under 35 U.S.C. 154(b) by 0 days.

(21) Appl. No.: 15/406,225

(22) Filed: Jan. 13, 2017

Related U.S. Application Data

(63) Continuation of application No. 14/320,507, filed on Jun. 30, 2014, now Pat. No. 9,579,564.

(51) Int. Cl.
*A63F 13/12* (2006.01)
*A63F 13/69* (2014.01)
(Continued)

(52) U.S. Cl.
CPC .............. *A63F 13/69* (2014.09); *A63F 13/35* (2014.09); *A63F 13/61* (2014.09)

(58) Field of Classification Search
CPC ........................................................ A63F 13/12
See application file for complete search history.

(56) References Cited

U.S. PATENT DOCUMENTS 5,816,918 A * 10/1998 Kelly ..................... A63F 3/081
463/16
5,933,813 A * 8/1999 Teicher ................ G06Q 10/087
235/375
(Continued)

FOREIGN PATENT DOCUMENTS

KR    1020130137431    12/2013
WO    2002026333    1/2002
(Continued)

OTHER PUBLICATIONS

Gem System—Street Fighter X Tekken, http://www.streettighter.com/us/sfxtk/features/gem-system, printed Nov. 6, 2012, 6 pages.
(Continued)

*Primary Examiner* — Jason Skaarup
(74) *Attorney, Agent, or Firm* — Sheppard Mullin Richter & Hampton LLP

(57) ABSTRACT

A system and method for facilitating player interaction with instances of virtual containers in an online game are disclosed. After player activation of an instance of virtual container in the online game, one or more virtual items may be determined as initial payouts to be distributed to the player. One or more redetermined offers may be presented to the player such that the player may enable to pay an amount of consideration in exchange for having some or all of the items in the initial payout redetermined to improve the initial payout. Responsive to player selection of a redetermination offer, an outcome whether the player wins the reward may be determined stochastically. Distribution of virtual items may be effectuated accordance with the stochastically determined outcome.

16 Claims, 4 Drawing Sheets

(51) Int. Cl.
*A63F 13/61* (2014.01)
*A63F 13/35* (2014.01)

(56) References Cited

U.S. PATENT DOCUMENTS

| | | | |
|---|---|---|---|
| 5,964,660 A * | 10/1999 | James | A63F 13/12 463/1 |
| 6,142,472 A * | 11/2000 | Kliebisch | A63F 3/04 273/236 |
| 6,190,225 B1 * | 2/2001 | Coleman | A23G 3/50 446/73 |
| 6,190,255 B1 * | 2/2001 | Thomas | G07F 17/32 463/20 |
| 6,347,996 B1 * | 2/2002 | Gilmore | G07F 17/32 273/139 |
| 6,402,619 B1 * | 6/2002 | Sato | A63F 13/005 463/23 |
| 6,561,904 B2 * | 5/2003 | Locke | G07F 17/32 463/20 |
| 6,604,008 B2 | 8/2003 | Chudley | |
| 6,607,437 B2 * | 8/2003 | Casey | G07F 17/32 463/16 |
| 6,745,236 B1 * | 6/2004 | Hawkins | A63F 3/00075 463/29 |
| 6,811,483 B1 * | 11/2004 | Webb | G07F 17/3267 273/143 R |
| 6,850,900 B1 * | 2/2005 | Hare | G06Q 30/0625 705/26.62 |
| 6,928,474 B2 * | 8/2005 | Venkatesan | G06F 17/30902 707/999.006 |
| 7,076,453 B2 * | 7/2006 | Jammes | G06F 17/3089 705/26.62 |
| 7,381,133 B2 * | 6/2008 | Thomas | G07F 17/32 463/20 |
| 7,533,336 B2 * | 5/2009 | Jaffe | G06F 17/243 705/27.1 |
| 7,660,740 B2 * | 2/2010 | Boone | G06Q 30/06 705/27.1 |
| 7,682,239 B2 | 3/2010 | Friedman | |
| 7,749,056 B2 * | 7/2010 | Ando | A63F 13/10 463/42 |
| 7,785,188 B2 * | 8/2010 | Cannon | G07F 17/3244 463/20 |
| 7,813,821 B1 | 10/2010 | Howell | |
| 7,819,749 B1 | 10/2010 | Fish | |
| 7,945,802 B2 * | 5/2011 | Hamilton, II | A63F 13/10 345/691 |
| 79,458,023 | 5/2011 | Hamilton, II | |
| 7,959,507 B2 * | 6/2011 | Cannon | G07F 17/3267 463/16 |
| 8,010,404 B1 * | 8/2011 | Wu | G06Q 30/02 705/1.1 |
| 8,016,668 B2 * | 9/2011 | Hardy | G06Q 30/0209 273/460 |
| 8,047,909 B2 * | 11/2011 | Walker | G07F 17/32 463/16 |
| 8,057,294 B2 * | 11/2011 | Pacey | G07F 17/32 273/138.1 |
| 8,066,571 B2 | 11/2011 | Koster | |
| 8,147,340 B2 | 4/2012 | Brunet de Courssou | |
| 8,157,635 B2 * | 4/2012 | Hardy | G07F 17/32 463/17 |
| 8,187,101 B2 * | 5/2012 | Herrmann | G06Q 30/02 463/42 |
| 8,226,472 B2 | 7/2012 | Van Luchene | |
| 8,231,453 B2 | 7/2012 | Wolf | |
| 8,231,470 B2 | 7/2012 | Feeney | |
| 8,239,487 B1 * | 8/2012 | Hoffman | G06Q 30/00 463/42 |
| 8,246,439 B2 | 8/2012 | Kelly | |
| 8,272,934 B2 | 9/2012 | Olive | |
| 8,272,951 B2 | 9/2012 | Ganz | |
| 8,272,956 B2 * | 9/2012 | Kelly | A63F 13/85 463/1 |
| 8,282,491 B2 | 10/2012 | Auterio | |
| 8,287,367 B2 | 10/2012 | Hall | |
| 8,287,383 B1 * | 10/2012 | Etter | H04L 67/38 463/42 |
| 8,287,384 B2 | 10/2012 | Auterio | |
| 8,292,743 B1 | 10/2012 | Etter | |
| 8,313,372 B2 * | 11/2012 | Naicker | G07F 17/32 273/142 R |
| 8,317,584 B2 | 11/2012 | Aoki | |
| 8,317,601 B1 * | 11/2012 | Luciano, Jr. | G07F 17/32 463/16 |
| 8,323,110 B2 | 12/2012 | Shibamiya | |
| 8,328,642 B2 | 12/2012 | Mosites | |
| 8,332,260 B1 * | 12/2012 | Mysen | G06Q 10/00 380/231 |
| 8,332,544 B1 | 12/2012 | Ralls | |
| 8,348,716 B2 * | 1/2013 | Ganz | G06Q 30/02 446/175 |
| 8,348,762 B2 | 1/2013 | Willis | |
| 8,348,767 B2 * | 1/2013 | Mahajan | A63F 13/60 463/42 |
| 8,348,768 B2 | 1/2013 | Auterio | |
| 8,360,858 B2 | 1/2013 | LaRocca | |
| 8,360,867 B2 | 1/2013 | VanLuchene | |
| 8,360,868 B2 | 1/2013 | Shvili | |
| 8,366,544 B2 * | 2/2013 | Walker | G06Q 30/02 463/29 |
| 8,366,550 B2 | 2/2013 | Herrmann | |
| 8,371,925 B2 * | 2/2013 | Bonney | G07F 17/32 463/16 |
| 8,376,826 B2 * | 2/2013 | Katz | G07F 17/32 273/138.2 |
| 8,382,572 B2 | 2/2013 | Hoffman | |
| 8,388,427 B2 | 3/2013 | Yariv | |
| 8,401,913 B2 * | 3/2013 | Alivandi | A63F 13/12 705/26.1 |
| 8,408,989 B2 | 4/2013 | Bennett | |
| 8,409,015 B2 * | 4/2013 | Van Luchene | G06Q 20/108 463/1 |
| 8,439,759 B1 * | 5/2013 | Mello | G06Q 10/10 463/42 |
| 8,475,262 B2 | 7/2013 | Wolf | |
| 8,506,394 B2 | 8/2013 | Kelly | |
| 8,512,150 B2 | 8/2013 | Herrmann | |
| 8,583,266 B2 | 11/2013 | Herbrich | |
| 8,636,591 B1 * | 1/2014 | Hawk | G07F 17/3244 463/16 |
| 8,696,428 B1 | 4/2014 | Post | |
| 8,715,068 B2 | 5/2014 | Arnone | |
| 8,777,754 B1 | 7/2014 | Santini | |
| 8,784,214 B2 | 7/2014 | Parks | |
| 8,790,185 B1 * | 7/2014 | Caldarone | A63F 13/10 463/39 |
| 8,821,260 B1 * | 9/2014 | DeSanti | A63F 13/69 463/25 |
| 8,831,758 B1 | 9/2014 | Chu | |
| 8,851,978 B1 * | 10/2014 | Koh | A63F 9/24 463/23 |
| 8,920,243 B1 * | 12/2014 | Curtis | A63F 13/61 463/40 |
| 8,961,319 B1 * | 2/2015 | Pieron | G07F 17/3281 463/13 |
| 8,968,067 B1 * | 3/2015 | Curtis | A63F 13/335 463/29 |
| 9,138,639 B1 * | 9/2015 | Ernst | A63F 13/00 |
| 9,257,007 B2 | 2/2016 | Santini | |
| 2002/0059397 A1 * | 5/2002 | Feola | G06F 8/60 709/217 |
| 2002/0072412 A1 * | 6/2002 | Young | G06Q 30/02 463/42 |
| 2002/0094863 A1 | 7/2002 | Klayh | |
| 2002/0095327 A1 * | 7/2002 | Zumel | G06Q 10/04 705/400 |
| 2002/0115488 A1 | 8/2002 | Berry | |
| 2002/0119824 A1 | 8/2002 | Allen | |

(56) References Cited

U.S. PATENT DOCUMENTS

| | | | |
|---|---|---|---|
| 2002/0151351 A1 | 10/2002 | Baerlocher | |
| 2002/0165794 A1* | 11/2002 | Ishihara | G06Q 10/087 705/27.1 |
| 2002/0183105 A1 | 12/2002 | Cannon | |
| 2002/0193162 A1 | 12/2002 | Walker | |
| 2003/0008713 A1 | 1/2003 | Ushiro | |
| 2003/0027619 A1* | 2/2003 | Nicastro, Sr. | G07F 17/32 463/16 |
| 2003/0032476 A1* | 2/2003 | Walker | G06Q 20/00 463/25 |
| 2003/0102625 A1* | 6/2003 | Katz | A63F 3/06 273/138.1 |
| 2003/0109301 A1* | 6/2003 | Chudley | A63F 13/12 463/23 |
| 2003/0157978 A1* | 8/2003 | Englman | G07F 17/3244 463/16 |
| 2003/0174178 A1* | 9/2003 | Hodges | G06Q 30/02 715/848 |
| 2003/0190960 A1 | 10/2003 | Jokipii | |
| 2003/0216167 A1* | 11/2003 | Gauselmann | G07F 17/32 463/25 |
| 2004/0002387 A1* | 1/2004 | Grady | A63F 1/18 463/43 |
| 2004/0068451 A1* | 4/2004 | Lenk | G06Q 10/00 705/28 |
| 2004/0185932 A1 | 9/2004 | Lombardo | |
| 2004/0215524 A1* | 10/2004 | Parkyn | G06Q 20/12 705/80 |
| 2004/0219969 A1 | 11/2004 | Casey | |
| 2004/0224745 A1* | 11/2004 | Bregenzer | G07F 17/32 463/16 |
| 2004/0225387 A1 | 11/2004 | Smith | |
| 2004/0267611 A1* | 12/2004 | Hoerenz | G06Q 10/0637 705/14.13 |
| 2005/0096117 A1* | 5/2005 | Katz | A63F 3/00157 463/17 |
| 2005/0114223 A1* | 5/2005 | Schneider | G06Q 30/0611 705/80 |
| 2005/0165686 A1* | 7/2005 | Zack | G06Q 20/10 705/51 |
| 2005/0192087 A1* | 9/2005 | Friedman | G07F 17/3295 463/25 |
| 2005/0209008 A1* | 9/2005 | Shimizu | A63F 13/10 463/43 |
| 2005/0227751 A1* | 10/2005 | Zanelli | A63F 13/10 463/1 |
| 2005/0255914 A1* | 11/2005 | McHale | A63F 13/10 463/31 |
| 2005/0277474 A1* | 12/2005 | Barry | A63F 13/12 463/42 |
| 2006/0030407 A1* | 2/2006 | Thayer | G07F 17/32 463/42 |
| 2006/0063587 A1* | 3/2006 | Manzo | G07F 17/32 463/25 |
| 2006/0116196 A1* | 6/2006 | Vancura | G07F 17/32 463/20 |
| 2006/0155597 A1* | 7/2006 | Gleason | G06Q 30/02 705/14.12 |
| 2006/0200370 A1* | 9/2006 | Ratliff | G06Q 10/02 705/5 |
| 2006/0217198 A1 | 9/2006 | Johnson | |
| 2006/0287029 A1* | 12/2006 | Yoshinobu | A63F 13/10 463/9 |
| 2006/0287102 A1 | 12/2006 | White | |
| 2007/0021213 A1 | 1/2007 | Foe | |
| 2007/0077988 A1* | 4/2007 | Friedman | G07F 17/32 463/25 |
| 2007/0111770 A1 | 5/2007 | Van Luchene | |
| 2007/0129139 A1* | 6/2007 | Nguyen | G07F 17/3262 463/25 |
| 2007/0129147 A1 | 6/2007 | Gagner | |
| 2007/0191101 A1 | 8/2007 | Coliz | |
| 2007/0191102 A1 | 8/2007 | Coliz | |
| 2007/0213116 A1 | 9/2007 | Crawford | |
| 2007/0281285 A1* | 12/2007 | Jayaweera | G09B 7/02 434/156 |
| 2007/0287523 A1 | 12/2007 | Esses | |
| 2008/0009344 A1 | 1/2008 | Graham | |
| 2008/0032787 A1* | 2/2008 | Low | G07F 17/32 463/29 |
| 2008/0058092 A1* | 3/2008 | Schwartz | G07F 17/32 463/25 |
| 2008/0113706 A1* | 5/2008 | O'Halloran | G07F 17/3288 463/16 |
| 2008/0113815 A1* | 5/2008 | Weingardt | G07F 17/3276 463/42 |
| 2008/0124353 A1* | 5/2008 | Brodeur | A61K 39/095 424/190.1 |
| 2008/0154798 A1* | 6/2008 | Valz | G06Q 30/02 705/400 |
| 2008/0171599 A1 | 7/2008 | Salo | |
| 2008/0176625 A1 | 7/2008 | Kelly | |
| 2008/0194318 A1* | 8/2008 | Kralicky | G07F 17/32 463/25 |
| 2008/0200260 A1 | 8/2008 | Deng | |
| 2008/0207306 A1* | 8/2008 | Higbie | A63F 1/00 463/23 |
| 2008/0214295 A1* | 9/2008 | Dabrowski | G07F 17/3239 463/25 |
| 2008/0227525 A1* | 9/2008 | Kelly | A63F 3/081 463/20 |
| 2008/0234043 A1* | 9/2008 | McCaskey | A63F 13/12 463/29 |
| 2008/0248867 A1* | 10/2008 | Englman | G07F 17/3244 463/25 |
| 2008/0275786 A1* | 11/2008 | Gluck | G06Q 30/02 705/14.35 |
| 2008/0300045 A1* | 12/2008 | Ratcliff | G07F 17/32 463/25 |
| 2008/0318668 A1* | 12/2008 | Ching | G07F 17/3258 463/25 |
| 2009/0011812 A1 | 1/2009 | Katz | |
| 2009/0017886 A1* | 1/2009 | McGucken | A63F 13/005 463/1 |
| 2009/0036199 A1* | 2/2009 | Myus | G07F 17/34 463/23 |
| 2009/0048918 A1* | 2/2009 | Dawson | A63F 13/10 705/14.26 |
| 2009/0061982 A1* | 3/2009 | Brito | G07F 17/32 463/20 |
| 2009/0124353 A1* | 5/2009 | Collette | G07F 17/3258 463/25 |
| 2009/0204907 A1* | 8/2009 | Finn | G06Q 30/02 715/757 |
| 2009/0210301 A1* | 8/2009 | Porter | G06Q 30/02 705/14.54 |
| 2009/0234710 A1* | 9/2009 | Belgaied Hassine | G06Q 30/02 705/7.29 |
| 2009/0315893 A1 | 12/2009 | Smith | |
| 2010/0004048 A1 | 1/2010 | Brito | |
| 2010/0022307 A1 | 1/2010 | Steuer | |
| 2010/0035689 A1* | 2/2010 | Altshuler | A63F 13/12 463/39 |
| 2010/0041472 A1* | 2/2010 | Gagner | G07F 17/3244 463/26 |
| 2010/0041481 A1 | 2/2010 | Smedley | |
| 2010/0050088 A1* | 2/2010 | Neustaedter | A63F 13/12 715/745 |
| 2010/0070056 A1 | 3/2010 | Coronel | |
| 2010/0094841 A1* | 4/2010 | Bardwil | G06T 11/00 707/705 |
| 2010/0099471 A1 | 4/2010 | Feeney | |
| 2010/0107214 A1 | 4/2010 | Ganz | |
| 2010/0113162 A1 | 5/2010 | Vemuri | |
| 2010/0174593 A1* | 7/2010 | Cao | A63F 13/12 705/14.12 |
| 2010/0198653 A1* | 8/2010 | Bromenshenkel | G06Q 30/06 705/7.11 |

(56) References Cited

U.S. PATENT DOCUMENTS

| | | | |
|---|---|---|---|
| 2010/0210356 A1 | 8/2010 | Losica | |
| 2010/0227675 A1* | 9/2010 | Luxton | G07F 17/32 463/25 |
| 2010/0227682 A1 | 9/2010 | Reville | |
| 2010/0228606 A1* | 9/2010 | Walker | G06Q 30/02 463/42 |
| 2010/0240444 A1 | 9/2010 | Friedman | |
| 2010/0241491 A1* | 9/2010 | Eglen | G06Q 10/00 705/4 |
| 2010/0241492 A1* | 9/2010 | Eglen | G06Q 30/02 705/4 |
| 2010/0306015 A1 | 12/2010 | Kingston | |
| 2011/0065511 A1 | 3/2011 | Mahan | |
| 2011/0092271 A1* | 4/2011 | Nguyen | G07F 17/3244 463/25 |
| 2011/0092273 A1* | 4/2011 | Cerbini | G06Q 30/02 463/25 |
| 2011/0111841 A1 | 5/2011 | Tessmer | |
| 2011/0112662 A1 | 5/2011 | Thompson | |
| 2011/0113353 A1* | 5/2011 | Koh | G06F 3/0488 715/760 |
| 2011/0118002 A1* | 5/2011 | Aoki | G07F 17/32 463/20 |
| 2011/0145040 A1* | 6/2011 | Zahn | G06Q 30/02 705/7.33 |
| 2011/0151957 A1* | 6/2011 | Falciglia, Sr. | G07F 17/3244 463/18 |
| 2011/0218033 A1* | 9/2011 | Englman | G07F 17/32 463/25 |
| 2011/0227919 A1 | 9/2011 | Bongio | |
| 2011/0256921 A1 | 10/2011 | Pacey | |
| 2011/0256936 A1 | 10/2011 | Walker | |
| 2011/0263324 A1* | 10/2011 | Ganetakos | A63F 13/69 463/31 |
| 2011/0275438 A9* | 11/2011 | Hardy | G07F 17/32 463/42 |
| 2011/0281638 A1* | 11/2011 | Bansi | A63F 13/69 463/23 |
| 2011/0281654 A1 | 11/2011 | Kelly | |
| 2011/0282764 A1* | 11/2011 | Borst | G06Q 30/0641 705/27.1 |
| 2011/0300923 A1* | 12/2011 | Van Luchene | A63F 13/85 463/25 |
| 2011/0319152 A1* | 12/2011 | Ross | G07F 17/3202 463/20 |
| 2011/0319170 A1 | 12/2011 | Shimura | |
| 2012/0011002 A1* | 1/2012 | Crowe | G06Q 30/0241 705/14.66 |
| 2012/0015714 A1 | 1/2012 | Ocko | |
| 2012/0015715 A1 | 1/2012 | Luxton | |
| 2012/0034961 A1 | 2/2012 | Berman | |
| 2012/0034973 A1 | 2/2012 | Frank | |
| 2012/0040743 A1 | 2/2012 | Auterio | |
| 2012/0040761 A1* | 2/2012 | Auterio | A63F 13/12 463/42 |
| 2012/0042282 A1* | 2/2012 | Wong | G06F 17/30994 715/811 |
| 2012/0047002 A1* | 2/2012 | Patel | G06Q 30/0207 705/14.1 |
| 2012/0059730 A1* | 3/2012 | Jensen | G06Q 30/0601 705/26.1 |
| 2012/0083909 A1 | 4/2012 | Carpenter | |
| 2012/0094743 A1 | 4/2012 | Odom | |
| 2012/0101886 A1* | 4/2012 | Subramanian | G06Q 30/0611 705/14.23 |
| 2012/0108306 A1* | 5/2012 | Munsell | G07F 17/32 463/9 |
| 2012/0109785 A1* | 5/2012 | Karlsson | G06Q 30/0601 705/27.1 |
| 2012/0115593 A1* | 5/2012 | Vann | G07F 17/34 463/26 |
| 2012/0122589 A1* | 5/2012 | Kelly | A63F 13/12 463/42 |
| 2012/0129590 A1* | 5/2012 | Morrisroe | A63F 13/65 463/25 |
| 2012/0130856 A1* | 5/2012 | Petri | G06Q 30/0623 705/26.61 |
| 2012/0142429 A1* | 6/2012 | Muller | A63F 13/12 463/42 |
| 2012/0156668 A1 | 6/2012 | Zelin | |
| 2012/0157187 A1 | 6/2012 | Moshal | |
| 2012/0157193 A1* | 6/2012 | Arezina | G07F 17/3206 463/25 |
| 2012/0166380 A1* | 6/2012 | Sridharan | G06Q 30/02 706/52 |
| 2012/0166449 A1 | 6/2012 | Pitaliya | |
| 2012/0178514 A1 | 7/2012 | Schulzke | |
| 2012/0178515 A1* | 7/2012 | Adams | G07F 17/3295 463/17 |
| 2012/0178529 A1* | 7/2012 | Collard | A63F 13/428 463/31 |
| 2012/0197874 A1* | 8/2012 | Zatkin | G06Q 30/0282 707/722 |
| 2012/0202570 A1* | 8/2012 | Schwartz | G07F 17/3244 463/10 |
| 2012/0203669 A1* | 8/2012 | Borsch | G06Q 30/0601 705/27.1 |
| 2012/0215667 A1* | 8/2012 | Ganz | G06Q 30/0643 705/27.2 |
| 2012/0221430 A1* | 8/2012 | Naghmouchi | G06Q 30/0283 705/26.7 |
| 2012/0226573 A1 | 9/2012 | Zakas | |
| 2012/0231891 A1* | 9/2012 | Watkins, Jr. | G06Q 30/0283 463/43 |
| 2012/0244945 A1* | 9/2012 | Kolo | A63F 13/355 3/355 |
| 2012/0244947 A1 | 9/2012 | Ehrlich | |
| 2012/0244950 A1* | 9/2012 | Braun | G07F 17/3244 463/42 |
| 2012/0245988 A1* | 9/2012 | Pace | G06Q 30/0283 705/14.25 |
| 2012/0256377 A1 | 10/2012 | Schneider | |
| 2012/0282986 A1 | 11/2012 | Castro | |
| 2012/0289315 A1 | 11/2012 | Van Luchene | |
| 2012/0289330 A1* | 11/2012 | Leydon et al. | G07F 17/3255 463/31 |
| 2012/0289346 A1* | 11/2012 | Van Luchene | A63F 13/85 463/42 |
| 2012/0295699 A1* | 11/2012 | Reiche | A63F 13/79 463/29 |
| 2012/0296716 A1* | 11/2012 | Barbeau | G06Q 30/02 705/14.13 |
| 2012/0302329 A1* | 11/2012 | Katz | A63F 3/00157 463/25 |
| 2012/0309504 A1* | 12/2012 | Isozaki | G07F 17/3244 463/25 |
| 2012/0311504 A1* | 12/2012 | van Os | G06F 3/0482 715/853 |
| 2012/0322545 A1 | 12/2012 | Arnone | |
| 2012/0322561 A1 | 12/2012 | Kohlhoff | |
| 2012/0330785 A1 | 12/2012 | Hamick | |
| 2013/0005437 A1 | 1/2013 | Bethke | |
| 2013/0005438 A1 | 1/2013 | Ocko et al. | |
| 2013/0005466 A1* | 1/2013 | Mahajan | A63F 13/216 463/36 |
| 2013/0005473 A1 | 1/2013 | Bethke | |
| 2013/0005475 A1 | 1/2013 | Mahajan | |
| 2013/0005480 A1* | 1/2013 | Bethke | A63F 13/822 463/42 |
| 2013/0006735 A1 | 1/2013 | Koenigsberg | |
| 2013/0006736 A1* | 1/2013 | Bethke | G06Q 30/02 705/14.12 |
| 2013/0012304 A1* | 1/2013 | Cartwright | G06Q 30/02 463/25 |
| 2013/0013094 A1 | 1/2013 | Parks | |
| 2013/0013326 A1 | 1/2013 | Miller | |
| 2013/0013404 A1 | 1/2013 | Suprock et al. | |

(56) References Cited

U.S. PATENT DOCUMENTS

| | | | |
|---|---|---|---|
| 2013/0013459 A1* | 1/2013 | Kerr | G06Q 30/0201 705/27.1 |
| 2013/0029745 A1 | 1/2013 | Kelly | |
| 2013/0072278 A1* | 3/2013 | Salazar | G07F 17/3262 463/16 |
| 2013/0079087 A1* | 3/2013 | Brosnan | G07F 17/3286 463/16 |
| 2013/0090173 A1* | 4/2013 | Kislyi | A63F 13/69 463/43 |
| 2013/0090750 A1 | 4/2013 | Herrman | |
| 2013/0095914 A1* | 4/2013 | Allen | G07F 17/3225 463/25 |
| 2013/0123005 A1 | 5/2013 | Allen | |
| 2013/0124361 A1* | 5/2013 | Bryson | G06Q 30/0631 705/26.7 |
| 2013/0151342 A1 | 6/2013 | Citron | |
| 2013/0173393 A1* | 7/2013 | Calman | G06Q 30/0207 705/14.66 |
| 2013/0178259 A1 | 7/2013 | Strause | |
| 2013/0210511 A1* | 8/2013 | LaRocca | G07F 17/32 463/12 |
| 2013/0217489 A1* | 8/2013 | Bronstein Bendayan | A63F 13/12 463/31 |
| 2013/0226733 A1* | 8/2013 | Evans | G06Q 30/06 705/26.25 |
| 2013/0237299 A1 | 9/2013 | Bancel | |
| 2013/0244767 A1* | 9/2013 | Barclay | G07F 17/3288 463/25 |
| 2013/0288757 A1* | 10/2013 | Guthridge | A63F 13/12 463/2 |
| 2013/0290147 A1* | 10/2013 | Chandra | A63F 13/792 705/27.1 |
| 2013/0303276 A1* | 11/2013 | Weston | A63F 13/10 463/29 |
| 2013/0310164 A1* | 11/2013 | Walker | G07F 17/32 463/26 |
| 2013/0344932 A1 | 12/2013 | Adams | |
| 2014/0004884 A1* | 1/2014 | Chang | H04W 4/025 455/456.3 |
| 2014/0018156 A1 | 1/2014 | Rizzotti | |
| 2014/0033262 A1* | 1/2014 | Anders | H04N 21/2343 725/116 |
| 2014/0038679 A1* | 2/2014 | Snow | G07F 17/322 463/11 |
| 2014/0067526 A1* | 3/2014 | Raju | G06Q 30/0242 705/14.46 |
| 2014/0067544 A1* | 3/2014 | Klish | G06Q 30/02 705/14.66 |
| 2014/0073436 A1* | 3/2014 | Takagi | A63F 13/795 463/42 |
| 2014/0087864 A1* | 3/2014 | Togashi | A63F 13/12 463/29 |
| 2014/0089048 A1* | 3/2014 | Bruich | G06Q 30/0201 705/7.32 |
| 2014/0100020 A1* | 4/2014 | Carroll | A63F 13/12 463/25 |
| 2014/0106858 A1 | 4/2014 | Constable | |
| 2014/0128137 A1* | 5/2014 | Balise, III | A63F 13/005 463/10 |
| 2014/0157314 A1* | 6/2014 | Roberts | H04L 67/10 725/40 |
| 2014/0206452 A1* | 7/2014 | Bambino | A63F 13/69 463/40 |
| 2014/0243072 A1* | 8/2014 | Santini | G07F 17/32 463/20 |
| 2014/0274359 A1* | 9/2014 | Helava | A63F 13/00 463/29 |
| 2014/0295958 A1* | 10/2014 | Shono | A63F 13/00 463/31 |
| 2014/0315616 A1 | 10/2014 | Avin | |
| 2014/0329585 A1* | 11/2014 | Santini | G07F 17/3244 463/25 |
| 2014/0337259 A1* | 11/2014 | Lamb | G06N 5/025 706/14 |
| 2015/0011286 A1 | 1/2015 | Kim | |
| 2015/0019349 A1* | 1/2015 | Milley | G06Q 30/0275 705/14.71 |
| 2015/0031440 A1* | 1/2015 | Desanti | A63F 13/822 463/25 |
| 2015/0087378 A1 | 3/2015 | Louie | |
| 2015/0306494 A1* | 10/2015 | Pieron | A63F 13/822 463/31 |
| 2015/0335995 A1* | 11/2015 | McLellan | A63F 13/12 463/25 |
| 2015/0352436 A1* | 12/2015 | Pieron | A63F 13/12 463/25 |

FOREIGN PATENT DOCUMENTS

| | | |
|---|---|---|
| WO | 2013013281 | 1/2013 |
| WO | 2013059639 | 1/2013 |
| WO | 2013116904 | 1/2013 |
| WO | 2015013373 | 1/2015 |
| WO | 2015168187 | 11/2015 |
| WO | 2015179450 | 11/2015 |
| WO | 2015196105 | 12/2015 |

OTHER PUBLICATIONS

Profession—WoWWiki—Your guide to the World of Warcraft, URL: hftp://www.wowwiki.com/Profession, printed Nov. 6, 2012, 8 pages.

"Digital River World Payments and Lotaris Partner to Extend Mobile Application Licensing and Monetization capabilities to Software Publishers", Business Wire Press Release, http://www.marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.

"Behavioural Analytics & Campaigning", http://lotaris.com/behavioural._analytics_and._Campaigning.htm, screenshot access date May 24, 2012 2:21 PM, 1 page.

"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village-what-can-I-do->, Apr. 23, 2014, 9 pages.

"Clash of Clans". Wikipedia.org. Online. Accessed via the Internet. Accessed Aug. 9, 2014. <URL: http://en.wikipedia.org/wiki/Clash of Clans>, 3 pages.

"Gem calculation formulas", forum.supercell.net. Online. Accessed via the Internet. Accessed Aug. 9, 2014. <URL: http://forum.supercell.net/showthread.php/23028-Gem-calculation-formulas>, 3 pages.

"Building Structures". War2.warcraft.org. Online. Accessed via the Internet. Accessed Aug. 9, 2014. <URL: http://war2. warcraft.org/strategy/verybasics/building.shtml>, 3 pages.

City Coins. CityVille Wikia. Online. Accessed via the Internet. Accessed Aug. 9, 2014. <URL: http://cityville.wikia.com/wiki/City_Coins>, 2 pages.

Gaia "Black Friday Bundle" available on Nov. 23, 2011, from http://www.gaiaonline.com/forum/community-announcements/black-friday-big-bundles-rare-items/t.76127933/, 5 pages.

UBC, "Theory of Auctions" available on Mar. 24, 2012 from https://web.archive.org/web/20120324204610/http://montoya. econ.ubc.ca/Econ522/auctions.pdf, slide 5, Para. 1.3, 19 pages.

Wiki "Gala online'", available on Sep. 9, 2011, https://web.archive.org/web/20110927210155/http://en.wikipedia.org/wiki/Gaia_Online, 8 pages.

FriskyMongoose "Happy Island Updates", available Jun. 12, 2012 from https://web.archive.org/web/20120612004417/http://friskymongoose.com/happy-island-updates-new-attractions-decorations-and-limited-edition-item-bundlest, 7 pages.

(56) References Cited

OTHER PUBLICATIONS

TFWiki "teamfortress wiki" available Nov. 5, 2011 retrieved from https://web.archive.org/web/20111105044256/http://wiki.teamfortress.com/wiki/Loadout, 4 pages.
MMO Site "Rose Online Launches the Newest in Game Feature"; available Aug. 11, 2011 from https://web.archive.org/web/20110811231226/http://news.mmosite.com/content/2011-06-211-rose_online_launches_the_newest_in_game_feature.l.shtml, 3 pages.
Super Mario Bros. 3 Review, Nintendo for NES, Feb. 1990, pp. 1-4.
Super Mario Bros. 3, NES Gameplay, http://www.youtube.com/watch?v=82TL-Acm4ts, Published on Mar. 14, 2009, 1 page.
"Kabam Community Forums > Kingdoms of Camelot > Kingdoms of Camelot Open Discussion > Open Discussion : Tournament of Might Prizes / Main Discussion thread", printed from http://community.kabam.com/forums/archive/index.php/t-43273.html, Oct. 24, 2011, 23 pages.
"Rest—WoWWiki—Your guide to the World of Warcraft", printed from http://www.wowwiki.com/Rest, May 19, 2014, 2 pages.
Quest item—WoWWiki—Your guide to the World of Warcraft', printed from http://www.wowwiki.com/Quest_Item, Retrieved on Apr. 16, 2014, 1 page.
"Cataclysm Guide: Guild Advancement—Wowhead", http://www.wowhead.com/guide=cataclysm&guilds, printed Dec. 5, 2013, 4 pages.
TFF Challenge—UC Davis, http://tffchallenge.com/team/uc-davis/, printed Jan. 15, 2014, 12 pages.
"Guild Housing System—FlyFF Wiki", http://flyff-wiki.gpotato.com/wiki/Guild_Housing_System, printed Dec. 5, 2013, 5 pages.
Elsword, Dec. 27, 2007, KOG Studios, Guide posted Mar. 17, 2011, http://forums.elswordonline.com/topic5673.aspx, http://en.wikipedia.org/wiki/Elsword, 16 pages.
Diablo 2, Blizzard Entertainment, Mar. 23, 2009, manual and online website, http://web.archive.Org/web/20090323171356/http//classic.battle.net/diablo 2exp/items/basics.shtml, 51 pages.
Path of Exile, Internet posting: http://web.archive.org/web/20120606004658/http://www.pathofexile.com/forum/view-thread/12056, Nov. 16, 2011, 52 pages.
MapleStory—Guides—Equipment Upgrading 101: Scrolls, URL: maplestory.nexon.net/guides/game-play/systems/OOFFV/#mitigating [Retrieved Jun. 24, 2013], 4 pages.
MapleStory—Guides—Equipment Upgrading 101: Potentials, URL: maplestory.nexon.net/guides/game-play/systems/OOFlj/ [Retrieved Jun. 24, 2013], 5 pages.
Dreamslayer's Enchanting and Upgrading Guide—With Pictures:D and Explanations, URL: forums.elswordonline.com/Topic5673.aspx [Retrieved Feb. 21, 2013], 8 pages.
The Arreat Summit—Items: Basic Item Information, URL: web.archive.org/web/20090323171356/http://classic.battle.net/diablo2exp/items/basics.shtml [Retrieved Feb. 21, 2013], 3 pages.
Elsword—Wikipedia, the free encyclopedia, URL: en.wikipedia.org/wiki/Elsword [Retrieved Feb. 21, 2013], 6 pages.
Path of Exile—Forum—Beta General Discussion—Unique Items Compendium 60/71 URL: web.archive.org/web/20120608004658/http://www.pathofexile.com/forum/view-thread/12056 [Retrieved Jun. 24, 2013], 52 pages.
Super Mario Bros. 3, StrategyWiki, the video game walkthrough and strategy guide, http://strategywiki.org/wiki/Super_Mario_Bros._3, Oct. 2, 2012, 4 pages.
MapleStory, Internet guide: http://maplestory.nexon.net/guides/game-play/systems/00Flk/, http://maplestory.nexon.net/guides/game-play/systems/00Flk, http://maplestory.nexon.net/guides/game-play/systems/00FFV, Sep. 28, 2012, 12 pages.
"Warcraft II: Tides of Darkness". Wikipedia.org. Online. Accessed via the Internet. Accessed Aug. 9, 2014. <URL: http://en.wikipedia.org/wiki/Warcraft_II:_Tides_of_Darkness>, 10 pages.
"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.
Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1-14-29-Hamari,Lehdonvirta.pdf, on May 26, 2015, 16 pages.
"Digital River World Payments and Lotaris Partner to Extend Mobile Application Licensing and Monetization Capabilities to Software Publishers", LOTARIS Press Release, http://www.lotaris.com/digital_river_world_payments_and_lotaris_partne . . . , posted Tuesday, Mar. 27, 2012, screenshop access date May 24, 2012, 2:19 PM, 1 page.
MapleStory—Guides—Equipment Upgrading 101: Enhancements, URL: maplestory.nexon.net/guides/game-play/systems/OOFlk; [Retrieved Jun. 24, 2013] 3 pages.
Katkoff, Michail, "Clash of Clans—the Winning Formula", Sep. 16, 2012, retrieved from Internet on Sep. 30, 2015 from URL <http://www.deconstructoroffun.com/2012/09/clash-of-clans-winning-formula.html>, 13 pages.
Ozeagle, "What happens if . . . answers about account types" on Lotro forum, Jan. 18, 2011,<https://www.lotro.com/forums/showthread.php?377885-What-happens-if-answers-about-the-account-types> (16 pgs).
<http://lotro-wiki.com/index.php?title=Ouest:A_Little_Extra_Never_Hurts_—_Part_2&oldid=399366>, <http://lotrowiki.com/index.php ?title=Getting_Started&oldid=349681 >. Links are to used articles. (7 pgs) Feb. 26, 2014.
"Lotro-Wiki.com" (evidence in regards to "Lord of the Rings Oline" MMORPG game), latest Dec. 22, 2011, <http://lotrowiki.com/index.php/Main_Page), http://lotro-wiki.com/index.php?title=LOTRO_Store&oldid=396550, http://lotro-wiki.com/index.php?title=Quest:A_Little_Extra_Never_Hurts_—_Part_l&oldid=399597, http://lotro-wiki.com/index.php?title=Quest:A_Little_Extra_Never_Hurts_—_Part_2&oldid=399366, http://lotro-wiki.com/index.php?title=Getting_Started&oldid=349681, Links are to used articles, 33 pages.
"Treasure Chest Game" written by Zelda Wiki, the Zelda encyclopedia; published on or before Oct. 17, 2012; accessible andprinted from URL <http://web.archive.org/web/20121017085058/http://zeldawiki.org/ Treasure_Chest_Game>, 4 pages.
"Quest: A Little Extra Never Hurts—Part 1" written by Zimoon, published on Dec. 22, 2011 and printed from URL <http://lotro-wiki.com/index.php?title=Quest:A_Little_Extra_Never_Hurts_—_Part_1 &oldid=399597>, 3 pages.
"Quest: A Little Extra Never Hurts—Part 2" written by Zimoon, published on Dec. 21, 2011 and printed from URL <http://lotro-wiki.com/index.php?title=Quest:A_Little_Extra_Never_Hurts_—_Part_2&oldid=399366>, 2 pages.
"Getting Started" written by BoD, published on Oct. 13, 2011 and printed from URL <http://lotrowiki.com/index.php?title=Getting_Started&oldid=349681 >, 5 pages.
"Lotro Store" written by Elinnea, published on Dec. 15, 2011 and printed from URL <http://lotrowiki.com/index.php ?title=LOTRO_Store&oldid=396550>, 23 pages.
"Main Page" written by Starbusty, published on Dec. 12, 2011 and printed from URL <http://lotrowiki.com/index.php?title=Main_Page&oldid=394429>, 2 pages.
New Feature: Tiered Tournaments and Tournament Updates, printed from http://community.kabam.com/forums/showthread.php?171349-New-Feat on Feb. 11, 2014, 2 pages.
Wikipedia, Mafia Wars, <http://en.wikipedia.org/wiki/Mafia_Wars>, Jan. 28, 2012, 3 pages.

\* cited by examiner

An Instance of A Virtual Container (e.g., a Mystery Box)

DOUBLE OR NOTHING VIRTUAL CONTAINERS

Field of the Disclosure

This disclosure relates to facilitating player interactions with virtual containers within an online game.

Background

Providing virtual containers, such as treasure boxes, treasure troves, combat, boxes, war chests, lucky boxes, resource boxes, resource chests, mystery boxes, mystery chests, random boxes, and/or any other type(s) of virtual container(s) in an online game is generally known in the art. Such a virtual container may be activated by a player to acquire an item in the online game. In implementations, the item may be distributed to the player in accordance with a stochastic determination. For example, a first item may be associated with a given virtual container such that there is a 10% chance it will be distributed to the player upon player activation of the given virtual container, a second item with a 20% chance of being distributed to the player upon the activation, a third item with a 25% chance of being distributed to the player upon the activation, and so on.

Summary

One aspect of the disclosure relates to facilitating player interaction with a virtual container provided in an online game. Players may be enabled to pay for a chance to improve an initial payout of an instance of a virtual container after the player activates that instance of the virtual container. As used herein, an initial payout of the instance of the virtual container may refer to a virtual item associated with a set of potential awards. Upon activation by a player, an award from the set of potential awards may be determined, stochastically or quasi-stochastically. The determined award may be distributed to the player. The individual potential awards may include one or more virtual items usable in the online game. Activation of a virtual container and/or distribution of an award therefrom may exhaust a virtual container. An exhausted virtual container may no longer be available for use and/or activation by the player. Prior to activation, a virtual container may be acquired and/or held in an inventory by the player. This disclosure may describe a mechanism by which the player may obtain a redetermination of an initial award, or initial payout, for a virtual container prior the virtual container becoming exhausted.

Responsive to the determination of the initial payout, offers may be presented to enable the player to select a preferred way to receive the initial payout of the activated instance of virtual container. For example, one offer may be presented to enable the player to receive the initial payout as-is. As used herein, such an offer may be referred to as an "even" offer. Another offer may be presented to enable the player to have the initial payout redetermined for distribution such that the actual payout of the instance of The virtual container may be improved. As used herein, such an offer may be referred to as a "redetermination" offer. As used herein, the one or more items in the initial payout that may be redetermined for distribution may be referred to as the "redeterminable" item(s) in the initial payout. For monetization, the player may be required to pay an amount of consideration in exchange for having the redetermination of the initial payout performed as specified by the "redetermination" offer. The consideration may include virtual currency, stored credit (e.g., points), real-world money credit, and/or any other type(s) of consideration.

Upon player acceptance of the "redetermination" offer, an outcome of the initial payout redetermination may be made stochastically or quasi-stochastically. In cases where the outcome of the redetermination is in favor of the player, the initial payout may be improved. In some implementations, the amount of the consideration required by the "redetermination" offer may be inversely proportional to the value (real and/or perceived) of the item(s) in the initial payout. For example, a "redetermination" offer that includes a rare item as a "redeterminable" item may require an amount of consideration from the player lower than that required by another "redetermination" offer with a regular item as a "redeterminable" item. In some implementations, in cases where the outcome of the redetermination is not in favor of the player, the player may be enabled to try again on the same "redeterminable" item(s) for an amount of consideration less than that the player has previously paid for the unsuccessful try. This may enhance player experience in the online game by facilitating players to interact with activated instances of virtual container. This may improve monetization opportunities for the provider of the online game as the players may be motivated to spend to increase the initial payout of activated instances of virtual containers.

A system configured to enable a player to improve a payout of a virtual container in an online game may include one or more servers. The servers may operate in a client/server architecture with one or more client computing platforms. The client computing platforms may be associated with the players of the game space. The servers may be configured to execute one or more of: a game component, an inventory component, a virtual container component, an activation component, an offer component, a distribution determination component, an evaluation component, and/or any other components.

The game component may be configured to execute an instance of a given online game. The instance of the given online game executed by the game component may be associated with a given game space in which gameplays may be facilitated for players of the given online game. Players may control one or more elements within the given game space. The players may input commands with specific parameters to undertake specific deeds, maneuvers, actions, functions, spheres of actions, and/or any other types of interactions within the given game space.

The inventory component may be configured to manage inventories of virtual items for players of the game space executed by the game component. A given player inventory managed by the inventory component may provide an accounting of virtual items, such as virtual currencies, resources, objects, units, and/or any other game space elements that have been procured, controlled by, and/or otherwise associated with a given player in the game space.

The virtual container component may be configured to provide instances of virtual containers for player interaction in the game space executed by the game component. The instances of virtual containers provided by the virtual container component may be used for distributing virtual items stochastically or quasi-stochastically to inventories associated with the players. Examples of virtual containers that may be provided in the game space may include treasure boxes, treasure troves, combat boxes, war chests, lucky boxes, resource boxes, resource chests, mystery boxes, mystery chests, random boxes, and/or any other type(s) of virtual container(s). As such, a given instance of a virtual container may be associated with a set of potential items such that upon player activation of the instance of the given virtual container, one or more items in the set of potential items may be distributed to the player inventory stochastically or quasi-stochastically. The individual one or more items in the set of potential items associated with the given instance of the virtual container may be associated with corresponding distribution probabilities for distribution to the players.

The activation component may be configured to activate instances of virtual containers responsive to player activation requests, and to determine an initial payout in accordance with distribution probabilities corresponding to individual potential items associated with the activated instances of the virtual containers. In implementations, responsive to receiving the activation request from the player, the activation component may obtain the distribution probabilities corresponding to the potential items in the set of potential items associated with the activated instance of the virtual container; determine stochastic or quasi-stochastic distribution of one or more items in the sets of the potential items to the player in accordance with the distributed probabilities; and/or any other operations.

The offer component may be configured to effectuate, responsive to the player's activation of an instance of virtual container, presentation of offers on a client computing platform associated with a player. The offers may include an "even" offer that specifies the player may accept the initial payout determined by the activation component, one or more "redetermination" offers that specify the player may have the initial payout of the activated instances of the virtual containers redetermined to improve the initial payout, and/or any other offers. A given "redetermination" offer may specify an amount of consideration that the player may pay in order to accept the given "redetermination".

In implementations, effectuating presentation of the "redetermination" offers by the offer component may involve obtaining configuration of the "redetermination" offers. A configuration of an obtained "redetermination" offer for a given instance of virtual container may include an amount of consideration for having the specified redetermination performed, probabilities of redetermination, designation of one or more "redeterminable" items, terms for win or loss, and/or any other configurations for the "redetermination" offer. The "redetermination" offer may specify an amount of consideration for having the specified redetermination performed. The consideration may include an amount of virtual currencies, stored credits (e.g., points), real-world money credit, virtual items, and/or any other type(s) of consideration desired by the provider, administrator, moderator, and/or any other entities related to the game space. In some implementations, the amount of the consideration for the redetermination as specified by the "redetermination offer" may be proportional to the value (real and/or perceived) of the "redeterminable" item(s) included in the "redetermination" offer. The "redetermination" offer may be associated with probability specifying an odd by which the player may achieve a favorable redetermination of the initial payout. In some implementations, the probability associated with the "redetermination" offer may be determined dynamically based on various factors, such as monetization rate, play rate, difficulty rate, value rate, and/or any other factors within the game space. The "redetermination" offer may include one or more "redeterminable" items, which may include some or all of the items in the initial payout. In some implementations, which one(s) of the item(s) in the initial payout may be determined dynamically for inclusion as "redeterminable" item(s) based on various factors, such as monetization rate, play rate, difficulty rate, value rate, and/or any other factors within the game space. The "redetermination" offer may be associated with one or more terms of winning and losing the redetermination. For example, without limitation, the terms may specify losing some or all of the consideration if the player achieves an unfavorable redetermination outcome, losing some or all of the consideration even if the player achieves a favorable redetermination outcome, increasing the amount of "redeterminable" item(s) in the payouts if the player achieves a favorable redetermination outcome, and/or any other terms.

The distribution determination component may be configured to distribute one or more virtual items to inventory associated with the player in accordance with the "redetermination" offer accepted by the player. Determining the distribution of the items by the distribution determination component may involve obtaining the configuration of the "redetermination" offer selected by the player, determining whether the player achieves a favorable or unfavorable redetermination outcome in accordance with the probability specified in the configuration of the "redetermination" offer accepted by the player, distributing the items in accordance with the outcome of the redetermination, and/or any other operations. Based on the outcome of the redetermination, items may be distributed to the player as the actual payout of the activated instance of virtual container.

The evaluation component may be configured to evaluate an outcome of the redetermination of the initial payout of an activated instance of a virtual container. The evaluation by the evaluation component may involve determining values of the items distributed to players as the result of the redetermination. The values of the items may be evaluated by the evaluation component based on their availability (or scarcity) in the game space, their price in a virtual store associated with the game space, their utility in the game space, and/or any other factors. In some implementations, responsive to the determination that the player has not achieved a favorable redetermination outcome, the offer component may be configured to effectuate presentation of "redetermination" offers to the player again.

These and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
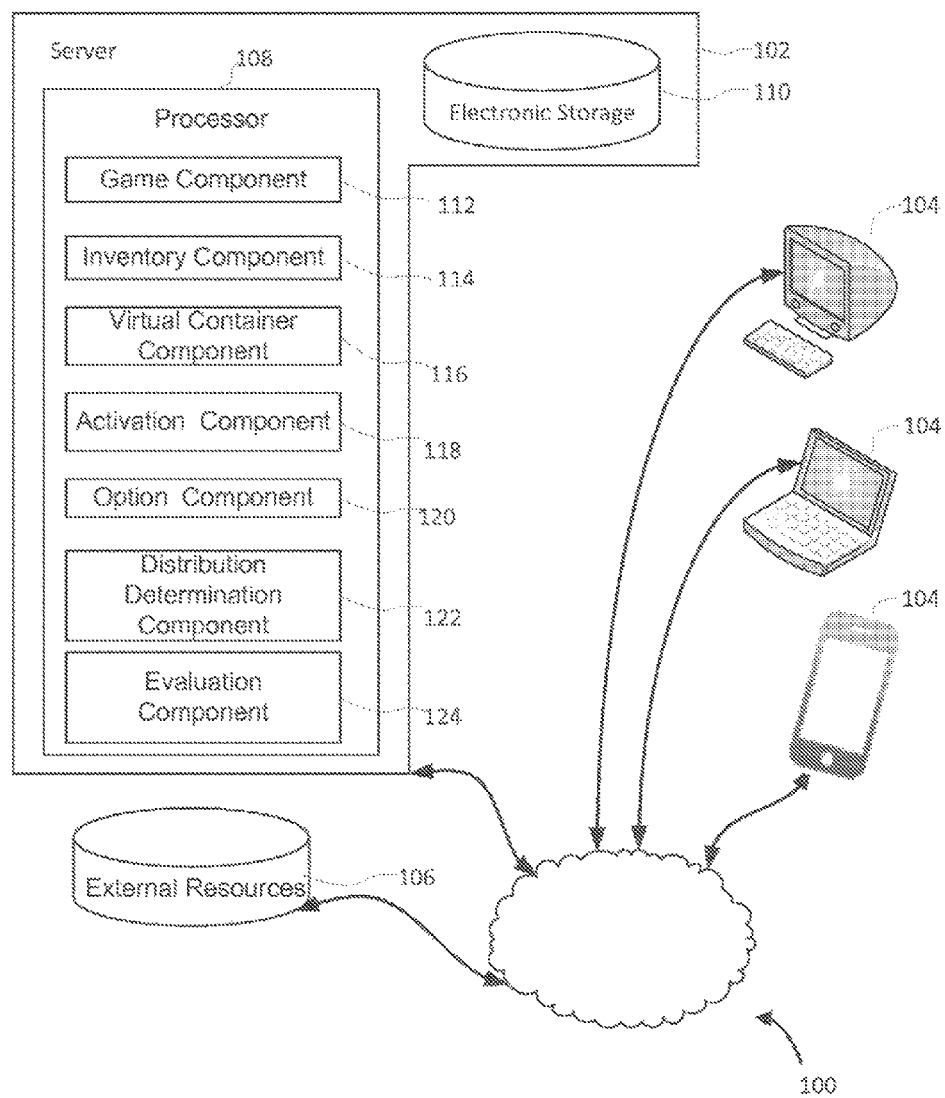
FIG. 1 illustrates one example of a system configured to enable a player to accept "redetermination" offer to improve an initial payout of an activated instance of a virtual container in an online game in accordance with the disclosure.

FIG. 1 illustrates one example of a system 100 configured to enable a player to improve payout of a virtual container in accordance with the disclosure. Providing the online games may include hosting the online games over a network. In some implementations, as shown in this example, system 100 may include servers 102 configured for hosting online games. The server 102 may be configured to communicate with one or more client computing platforms 104 according to a client/server architecture. The players may access system 100 and/or a game space associated with the online game via client computing platforms 104. As shown, the servers 102 may comprise processors 108 configured to execute computer-readable instructions to implement system components. The computer program components may include one or more of a game component 112, an inventory component 114, a virtual container component 116, an activation component 118, an offer component 120, a distribution determination component 122, an evaluation component 124, and/or other components.

The game component 112 may be configured to execute an instance of an online game. Within the instance of the online game executed by the game component 112, players may interact with elements in the online game and/or with each other through gameplays provided by the online game. The gameplays may include role-playing, first-person shooter, real-time strategy, turn-based strategy, simulation, music or rhythm playing, social interaction, twitching, and/or any other gameplays. The execution of the instance of the online game by game component 112 may include determining a state associated with the online game. The state may be communicated (e.g., via streaming visual data, object/position data, and/or other state information) from server 102 to client computing platforms 104 for presentation to players. The state determined and transmitted to a given client computing platform 104 may correspond to a view for a player character being controlled by a player via the given client computing platform 104. The state determined and transmitted to a given client computing platform 104 may correspond to a location in a game space associated with the online game. The view described by the state for the given client computing platform may correspond, for example, to the location from which the view is taken, the location the view depicts and/or other locations, a zoom ratio, a dimensionality of objects, a point-of-view, and/or view parameters of the view. One or more of the view parameters may be selectable by the player.

The instance of the online game may be persistent. That is, the online game may continue on whether or not individual players are currently logged in and/or participating in the online game. A player that logs out of the online game and then logs back in some time later may find the game space associated with the online game has been changed through the interactions of other players with the game space during the time the player was logged out. These changes may include changes to the simulated physical space, changes in the player's inventory, changes in other players' inventories, changes experienced by non-player characters, and/or other changes.

The instance of the online game may comprise a simulated game space, e.g., a game space that is accessible by players via clients (e.g., client computing platforms 104) that present the views of the game space to a player. The game space may have a topography, express ongoing real-time interaction by one or more players, and/or include one or more objects positioned within the topography that are capable of locomotion within the topography. In some instances, the topography may be a two-dimensional topography. In other instances, the topography may be a three-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The instance of the online game may comprise game space entities automatically controlled in the instance of the online game. Such game space entities may not be associated with any player. As such, the automatically controlled game space entities may be generated and/or developed by artificial intelligence configured with the server 102 by a provider, administrator, moderator, and/or any other entities related to the online game. These automatically controlled entities may evolve within the game space associated with the online game free from player controls and may interact with the entities controlled by or associated with the players, other automatically controlled game space entities, as well as the topography of the game space. Certain manifested traits may be associated with the automatically controlled entities in accordance with the artificial intelligence configured with the server 102. As used herein, such automatically controlled game space entities in the instance of the online game are referred to as "non-player entities".

The above description of the manner in which the state of the game space associated with the online game as determined by game component 112 is not intended to be limiting. The game component 112 may be configured to express the game space in a more limited, or richer, manner. For example, views determined for the game space representing the state of the instance of the game space may be selected from a limited set of graphics depicting an event in a given place within the game space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the game space are contemplated.

Within the instance of the online game executed by game component 112, the players may participate in the instance of the online game by controlling one or more of an element in the game space associated with the online game. The player-controlled elements may include avatars, game space characters, game space units (e.g., troops), objects (e.g., weapons, horses, vehicle and so on), simulated physical phenomena (e.g., wind, rain, earthquakes, and/or other phenomena), and/or other player-controlled elements. The player-controlled avatars may represent the players in the game space. The player characters may include heroes, knights, commanders, leaders, generals, and/or any other game space entities that may possess strength, skills, abilities, magic powers, knowledge, and/or any other individualized attributes. The game space units controlled by the player may include troops and/or any other game space entities that may be trained, recruited, captured, and/or otherwise acquired by the players in groups or en mass. The objects controlled by the players may include weapons, vehicles, projectiles, magic items, wardrobes, boots, armor, knapsacks, medicine, healing potions, and/or any other virtual items that may be employed by the players for interaction within the online game.

In any case, the player-controlled elements may move through and interact with the game space (e.g., non-player entities, elements controlled by other players, and/or topography in the game space) associated with the online game. The elements controlled by a given player may be created and/or customized by the given player. The given player may have an "inventory" of virtual goods and/or currency usable within the game space.

Controls of virtual elements in the game space may be exercised through commands inputted by a given player through client computing platforms 104. The given player may interact with other players through communications exchanged within the game space. Such communications may include one or more of textual chat, instant messages, private messages, voice communications, and/or other communications. Communications may be received and entered by the players via their respective client computing platforms 104. Communications may be routed to and from the appropriate players through server 102 (e.g., through game component 112).

A given player may input commands with specific parameters to undertake specific deeds, actions, functions, spheres of actions, and/or any other types of interactions within the game space. For example, the given player may input commands to construct, upgrade, and/or demolish virtual buildings; harvest and/or gather virtual resources; heal virtual player-controlled elements, non-player entities, and/or elements controlled by other players; train, march, transport, reinforce, reassign, recruit, and/or arrange troops; attack, manage, create, demolish, and/or defend cities, realms, kingdoms, and/or any other game space locations controlled by or associated with the players; craft or transport virtual items; interact with and/or compete against or along with non-player entities and/or game space elements controlled by other players in combats; research technologies and/or skills; mine and/or prospect for virtual resources; complete missions, quests, and/or campaigns; exercise magic power and/or cast spells; and/or perform any other specific deeds, actions, functions, or sphere of actions within the game space. In some examples, the given player may input commands to compete against elements in an environment within the game space—i.e., Player vs. Environment (PvE) activities. In some examples, the given player may input commands to compete against each other within the game space—i.e., Player vs. Player (PvP) activities.

The game component 112 may be configured to execute player actions to facilitate interaction of the players with the game space and/or each other in response to receiving game space commands input by the players. Execution of the player action by the game component 112 may produce changes to the game state, which may reflect progression and/or results of the player actions. In some examples, stale changes caused by the execution of the player actions may be recorded in the electronic storage 110 to facilitate persistency throughout the instance of the online game. In some examples, execution of the player actions may not produce persistent changes to the game state (e.g., a player character jumping forward and backward successively may not produce any perceivable game state changes to other players).

Within the instance of the game space, virtual currencies may be provided to store and/or exchange of game space values. Units of the virtual currencies (for example, a gold, a gem, a silver, a coin, a token, and/or any other types of virtual currencies) may reflect game space values as determined by a provider, administrator, moderator, player, and/or any other entities related to the game space. Through one or more units of virtual currencies, game space values may be captured, stored, and circulated in the game space. As one non-limiting example, combinations of player actions, skills, virtual items, time, and/or any other game space elements may be captured, stored, and circulated through virtual currencies to reflect game space values created by player labor in interacting with the game space. For instance, a player may be provided 1,000 gems after prospecting and mining for the gems in the game space for a period of time with certain required mining equipment operable only by a skilled game space miner, which the player has expanded labor to become.

Within the instance of the game space executed by the game component 112, virtual currencies may be collected, earned, purchased, gifted, or otherwise acquired by the players. For example, the players may purchase the virtual currencies with real-world money consideration (e.g., credit payment through credit card, electronic vouchers provided by the provider of the online game, physical tokens, and/or any other types of real-world currencies) through a virtual store. The players may earn the virtual currencies, for example through gameplays provided in the game space (e.g., PvP activities, PvE activities, in-game tournaments, tasks, quests, missions, and/or any other gameplays in the game space). By way of a non-limiting example, a given player may earn a predetermined amount of virtual currencies after completing an in-game task in the game space. In some examples, the provider of the online game may simply make a certain amount of virtual currencies available, for instance through treasure troves in the game space such that the players may gratuitously collect the virtual currencies by exploring for the treasure troves. The players may acquire virtual currencies by receiving gifts that comprise virtual currencies from other players. One of ordinary skills in the art will appreciate that there are other ways for the players to acquire virtual currencies in the game space.

Within the instance of the game space executed by the game component 112, resources may be, for example, generated, cultivated, mined, harvested, purchased, earned, consumed, traded, and/or gifted over time by units, characters, pets, buildings, facilities, and/or any other infrastructure or entity in the game space for the player. Resources may be prospected. Resources may be virtual items of value that can be accumulated through participation in the game space, rather than virtual currencies that store values in the game space as described above. As such, resources may be used to satisfy resource requirements in the game space. By way of non-limiting examples, game space resources may include food (e.g., rice, fish, wheat, etc.). minerals (e.g., wood, iron, ore, coal, oil, stone, crystal, etc.), plants, animals, and/or any other resources appropriate for the game space. Transfer of resources between players may be reflected through player inventories such that the transferor player's inventory reduces an amount of the transferred resources that are added to the transferee player.

Inventory component 114 may be configured to manage inventories of virtual items for players of the game space executed by the game component 112. A given player inventory managed by the inventory component 114 may provide an accounting of virtual items, such as virtual currencies, resources, objects, units, and/or any other game space elements that have been procured, controlled by, and/or otherwise associated with a given player in the game space. Such accounting of virtual items may reflect balances of the virtual items, e.g., a quantity of these virtual items, associated with the given player in the game space. The virtual items in a given player inventory may include instances of virtual containers, virtual currencies, resources, objects usable in the game space (e.g., weapons, equipment, garments, etc.), units (e.g., troops), and/or any other virtual items. By way of a non-limiting example, the given player may have an X number of virtual currencies, a Y number of a virtual resources (e.g., iron, ore, wood, coal, etc.). and a Z number of troops in the inventory associated with the given player. In that example, the X, Y, and Z may reflect a level of balance of the virtual currencies, the resources, and troops associated with the given player, respectfully.

Balances of virtual items in the player inventory may increase, replenish, or exhaust in response to the player acquiring or consuming the virtual items through a virtual store operated by the provider of the online game, player actions in the game space (e.g., acquiring virtual objects, harvesting resources, consuming resources for crafting, etc.), game space activities participated in by the player, and/or other events associated with the player in which the player may acquire and/or consume virtual items. For example, construction actions initiated by players may consume specific resources in accordance with resource requirements associated with the construction actions, and the player inventory may exhaust the specific resource in the player inventory during execution of the construction. Conversely, players may acquire virtual containers, resources, virtual items, and/or other game space elements in the instance of the game space, and the balance of the virtual items in the player inventory may increase accordingly to reflect the player acquisition.

The virtual container component 116 may be configured to provide instances of virtual containers for player interaction in the game space executed by the game component 112. The instances of virtual containers provided by virtual container component 116 may be used for distributing virtual items stochastically or quasi-stochastically to inventories associated with the players. As such, the instances of virtual containers may be associated with sets of potential items. That is, a given instance of a virtual container may be associated with a set of potential items such that upon player's activation of the instance of the given virtual container, one or more items in the set of potential items may be distributed to the player inventory stochastically or quasi-stochastically. The set of potential items associated with the given instance of a virtual container may be grouped, for example, by the functions they serve, by characteristics they possess, by values they possess, and/or any other common attributes. For instance, the given instance of a virtual container may be associated with a set of combat items usable in the game space during combats, a set of resource items that may provide one or more resources to the players, and/or any other types of virtual items. Examples of the virtual containers that may be provided in the game space may include treasure boxes, treasure troves, combat boxes, war chests, lucky boxes, resource boxes, resource chests, mystery boxes, mystery chests, random boxes, and/or any other type(s) virtual container(s).

The instances of a virtual container provided by the virtual container component 116 may facilitate various player interactions within the game space executed by the game component 112. For example, instances of virtual containers may be provided for purchase in a virtual store of the game space, may be picked up by players in the game space after they complete in-game tasks, may facilitate players to engage in mini-games provided in the game space, and/or may be provided in any other manners. By way of non-limiting example, a virtual container associated with various potential combat items may be provided in the game space such that when a player kills an AI character (e.g., a monster), instances of the virtual container may be dropped by the AI character for the player to collect. Upon player activation of an instance of the dropped virtual container, one or more combat items in the set of potential combat items associated with the instance of the dropped virtual container may be determined stochastically or quasi-stochastically for distribution to the player inventory. New instances of the virtual container may be subsequently and similarly provided through another monster in the game space.

Individual items in the set of potential items associated with a given instance of a virtual container may be associated with corresponding distribution probabilities for distributing to the player inventories. The distribution probabilities may be determined, for example, by the provider(s) of the game space, by a probability component in the server 102 (not depicted), and/or by any other means. The distribution probabilities may be employed, for example, by the activation component 118 to simulate a stochastic or quasi-stochastic distribution of the items in the set of potential items to the player through the instances of the virtual container.

Figure 2A:
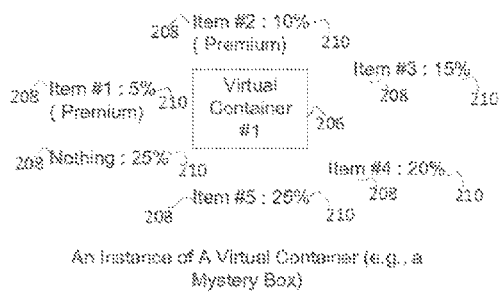
FIG. 2A illustrates an example of an instance of the virtual container provided in the online game hosted by the system shown in FIG. 1.

FIG. 2A illustrates an example of an instance of a virtual container provided in the game space hosted by the system 100 shown in FIG. 1. As shown in this example, the instance of virtual container 206, e.g., a mystery box, may be associated with a set of potential items 208. As illustrated, the individual ones of the potential items 208 may be associated with a corresponding distribution probability 210. In this example, as shown, among the set of potential items 208 associated with the instance of virtual container 206, items #1 and #2 are premium items (e.g., rare items in the game space) and have 5% and 10%, respectively, distribution probability to be distributed to the player when the player activates the instance of virtual container 206. As also illustrated, items #3, #4, and #5 may be regular items that are associated with a higher distribution probability than items #1 and #2. As still illustrated, a distribution probability may be associated with nothing such that nothing may be distributed to the player when the player activates the instance of virtual container 206.

The activation component 118 may be configured to activate instances of virtual containers responsive to player activation requests, and to determine an initial payout in accordance with the distribution probabilities corresponding to the individual potential items associated with the activated instances of the virtual containers. For example, a player may be enabled to click on an instance of a virtual container in the player inventory to activate an instance of a virtual container. The virtual container activation component 118 may be configured to receive the activation request from the player and to determine, stochastically or quasi-stochastically, one or more virtual items, i.e., the initial payout, for distribution to the player. In implementations, responsive to receiving the activation request from the player, the virtual container activation component 118 may obtain the distribution probabilities corresponding to the potential items in the set of potential items associated with the activated instance of the virtual container; determine stochastic or quasi-stochastic distribution of one or more items in the sets of the potential items to be distributed to the player in accordance with the distribution probabilities; and/or any other operations. In some exemplary implementations, the virtual container activation component 118 may employ a dice roll procedure for the stochastic or quasi-stochastic determination of the initial payout of the activated instance of the virtual container.

Figure 2B:
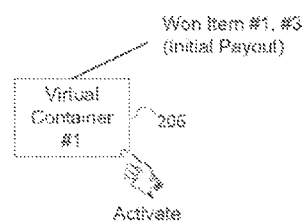
FIG. 2B illustrates one example of activating the instance of the virtual container shown in FIG. 2A.

FIG. 2B illustrates one example of activating the instance of the virtual container shown in FIG. 2A. As shown, the player may be enabled to activate the instance of virtual container 206 by clicking on the instance of virtual container 206. After the player activates the instance of virtual container 206, one or more virtual items, i.e., the initial payout, may be determined stochastically or quasi-stochastically for the player. In this example, items #1 and #3 are determined as the initial payout of the activated instance of virtual container 206 to the player.

The offer component 120 may be configured to effectuate, responsive to the player activates an instance of virtual container, presentation of offers on a client computing platform 104 associated with a player. The offers may include an "even" offer that specifies the player may accept the initial payout determined by the activation component 118, one or more "redetermination" offers that specifies the player may have the initial payout redetermined to improve the initial payout, and/or any other offers. A given "redetermination" offer may specify an amount of consideration required for the player to have the initial payout redetermined as specified by the "redetermination" offer. In some examples, the amount of consideration for the given "redetermination" offer may be an amount of virtual currencies, stored credits (e.g., points,), real-world money credit, and/or any other fiat consideration. In some examples, the amount of consideration for the given "redetermination" offer may be a quantity of the virtual items, e.g., the "redeterminable" item(s) included in the given "redetermination" offer. For instance, as an illustration, a "redetermination" offer may be presented to enable the player to bet one or more items in the initial payout such that those items may be doubled in the payout if the player achieves a favorable redetermination outcome, or may be removed from the initial payout if the player achieves an unfavorable redetermination outcome.

In implementations, effectuating presentation of the offers by the offer component 120 may involve obtaining configuration of the offers. In some implementations, the offers may be configured by the provider, administrator, moderator, and/or any other entities related to the game space and stored in storage location(s) such as the electronic storage 110. For example, without implementations, the provider of the online game may configure the "redetermination" offers for different instances of virtual containers via an interface and store the configured offers in the electronic storage 110 so that they may be presented to players via the offer component 120. In some implementations, an offer configuration component (not depicted) may be employed in the server 102 to configure the offers dynamically in accordance with one or more rules established by the provider, administrator, moderator, and/or any other entities related to the online game. In any case, a configuration of a "redetermination" offer for a given instance of virtual container may include an amount of consideration for invoking the "redetermination" offer, a probability for an outcome of winning a reward, one or more "redeterminable" items included in the "redetermination" offer, terms for wins or losses, and/or any other configuration for the "redetermination" offer.

The "redetermination" offer may specify an amount of consideration required for a player to have the initial payout redetermined as specified by the "redetermination" offer. The consideration may include an amount of virtual currencies, stored credits (e.g., points), real-world money credit, virtual items, and/or any other type(s) of objects desired by the provider, administrator, moderator, and/or any other entities related to the game space. For example, without limitation, the "redetermination" offer may specify that the consideration (e.g., cost) for having (e.g., play) the redetermination performed is 5 gems, 99 cents, 20 points, a sword, and/or any other consideration. In some implementations, the amount of consideration may include the "redeterminable" item(s). For example, the "redetermination" offer may specify that one or more items in the initial payout may be betted such that the player may increase the payout of the "redeterminable" item(s) (e.g., double) if the player wins, or lose the "redeterminable" item(s) in the payout if the player loses. This may create a player interaction with the activated instance of virtual container akin to "double or nothing" in a casino game. As an illustration, in one example, the initial payout of an instance of virtual container activated by a use may include a rare sword highly desired in the game space; a "redetermination" offer may be presented to the player specifying that the player may bet the rare sword such that if the player wins, the payout of the activated instance of virtual container will become two rare swords (i.e., doubling the initial payout), and if the player loses, the payout will become nothing (i.e., losing the initial payout).

In some implementations, the amount of the consideration for the "redetermination" offer may be inversely proportional to the value (real and/or perceived) of the item(s) in the initial payout. As an illustration, without limitation, in one implementation, the initial payout may include a rare magic item and a regular magic item. In that example, a first "redetermination" offer may be presented to the player specifying that the player may pay 2 gems to have the rare magic item determined, and a second "redetermination" offer may be presented to the player specifying the player may pay 5 gems to have the regular magic item redetermined.

In some implementations, without limitation, the "redetermination" offer may be associated with probability specifying the odds by which the player may achieve favorable redetermination outcomes. For example, without limitation, the "redetermination" offer may specify that the player may have a 40% of chance of improving the "redeterminable" items included in the "redetermination" offer. Such probability associated with the "redetermination" offer may or may not be presented to the player. In some instances, the provider of the online game may determine that the probability associated with the "redetermination" offer may be presented to the player to aid the player to determine opportunity cost in view of the chance of achieving a favorable redetermination outcome. However, this is not necessarily the only case. In some other instances, the probability associated with the "redetermination" offer may be kept secret from the player so as to keep the player guessing. This may add a random factor to the interaction of the instance of virtual container and enhance player experience. In some implementations, the probability associated with the "redetermination" offer may be determined dynamically based on various factors, such as monetization rate, play rate, difficulty rate, value rate and/or any other factors within the game space. For instance, in one implementation, higher probability of achieving a favorable redetermination outcome may be configured into the "redetermination" offer when a play rate of the online game is below a threshold so as to promote the online game; and lower probability of achieving a favorable redetermination outcome may be configured into the "redetermination" offer when a difficulty rate of the online game is below a threshold so as to make the online game more difficult.

The "redetermination" offer may include one or more item(s) in the initial payout to be redetermined, i.e., the "redeterminable" item(s). The "redeterminable" item(s) in the "redetermination" offer may include some or all of the items in the initial payout. For example, without limitation, if the initial payout includes 3 items, the "redeterminable" items may include 1, 2 or all 3 of the items. In some implementations, which one(s) of the item(s) in the initial payout may be determined dynamically for inclusion as "redeterminable" item(s) based on various factors, such as monetization rate, play rate, difficulty rate, value rate and/or any other factors within the game space. For instance, in one implementation, all of the items in the initial payout may be included in the "redetermination" offer as "redeterminable" items when a monetization rate of the online game is below a threshold; and only one of the items in the initial payout may be included in the "redetermination" offer as "redeterminable" items when a difficulty rate of the online game is below a threshold so as to make the online game more difficult, The "redetermination" offer may be associated with one or more terms of specifying win or loss of the redetermination. For example, without limitation, the terms may specify losing some or all of the consideration of the player achieves an unfavorable redetermination outcome, losing some or all of the consideration even if the player achieves a favorable redetermination outcome, increasing the amount of "redeterminable" item(s) in the payouts if the player achieves a favorable redetermination outcome, returning some or all of the consideration to the player if the player achieves a favorable redetermination outcome, and/or any other terms. For instance, as an illustration, the "redetermination" offer may specify that the player will lose all of the consideration but increase the amount of the "redeterminable" item(s) in the payout as a reward if the player achieves a favorable redetermination outcome. As another illustration, the "redetermination" offer may specify that the player will get the consideration back and increase the amount of "redeterminable" item(s), as a reward, if the player achieves a favorable redetermination outcome. Still as another illustration, the "redetermination" offer may specify that the player will lose the consideration and some or all of the "redeterminable" item(s) if the player achieves an unfavorable favorable redetermination outcome. Various other combinations of the win/loss terms included in the "redetermination" offer are contemplated.

Figure 2C:
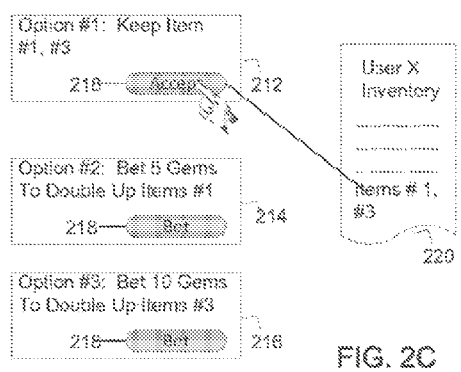
FIG. 2C illustrates one example of presenting offers to a player after player's activation of the instance of the virtual container illustrated in FIG. 2B.

FIG. 2C illustrates one example of presenting offers to a player after the player's activation of the instance of the virtual container illustrated in FIG. 2B. As can be seen from FIG. 2C, after the player activates the instance of virtual container 206 as illustrated in FIG. 2B, offers, such as offers 212, 214, and 216 illustrated in this example, may be presented to enable the player to interact with the instance of virtual container through field controls 218. In this example, as shown, offer 212 represents an "even" offer by which the player may accept the initial payout of the activated instance of virtual container 206, for example as determined by the activation component 118. As also shown, in this example, offers 214 and 216 represent "redetermination" offers by which the player can improve the items specified in the "redetermination" offers 214 and 216. As illustrated in this example, offer 214 specifies that the player may pay 5 gems as consideration in exchange for a chance to have item #1 in the initial payout redetermined, and offer 216 specifies that the player may pay 10 gems as consideration in exchange for a chance to have item #3 in the initial payout redetermined. The difference in the amount of consideration between offers 214 and 216 may be due to the difference between the values of item #1 and item #3 in the game space. For example, without limitation, item #1 may be a more desired item, e.g., a "chase" item, in the game space than item #3. In this example, as shown, the player accepts offer 212, the "even offer", to keep the initial payout. As a result, the initial payout of items #1 and item #3 is distributed to the inventory 220 associated with the player.

Returning to FIG. 1, the distribution determination component 122 may be configured to distribute one or more virtual items to inventory associated with the player in accordance with the offer accepted by the player. The accepted offer received by the distribution determination component 122 may include "redetermination", "even" offer, and/or any other offers. For example, the distribution determination component 122 may distribute the initial payout in accordance with the "even" offer accepted by the player. As another non-limiting example, the distribution determination component 122 may distribute the initial payout in accordance with the "redetermination" offer accepted by the player by determining, stochastically or quasi-stochastically, an outcome of the redetermination in accordance with the configuration of "redetermination" offer accepted by the player.

Determining the distribution of the items by the distribution determination component 122 may involve obtaining the configuration of the "redetermination" offer accepted by the player, determining whether the player achieves a favorable determination outcome in accordance with the probability specified in the configuration of the "redetermination" offer accepted by the player, distributing the items in accordance with the outcome of the redetermination, and/or any other consideration. For example, without limitation, the distribution determination component 122 may receive a player selection indicating that the player will pay an amount of consideration to have an item in the initial payout redetermined. In that example, the distribution determination component 122 may obtain a probability associated with the "redetermination" offer accepted by the player, and invoke a dice roll procedure for determining the outcome of the redetermination in accordance with the obtained probability. In some implementations, the probability obtained by the distribution determination component 122 may be the distribution probabilities originally associated with the activated instance of the virtual container. For example, without limitation, in one implementation, the distribution determination component 122 may obtain the distribution probability associated with the activated instance of the virtual container and redetermine the initial payout using the distribution probability. However, this is not necessarily the only case. As described above, in some implementations, the probability obtained by distribution determination component 122 may differ from the distribution probability originally associated with the activated instance of the virtual container. For example, without limitation, the obtained probability may be improved over the original distribution probability so that the player has a good chance to acquire a "better" item through the redetermination. Based on the outcome of the redetermination as performed by the distribution determination component 122, items may be distributed to the player as the actual payout of the activated instance of the virtual container.

Figure 2D:
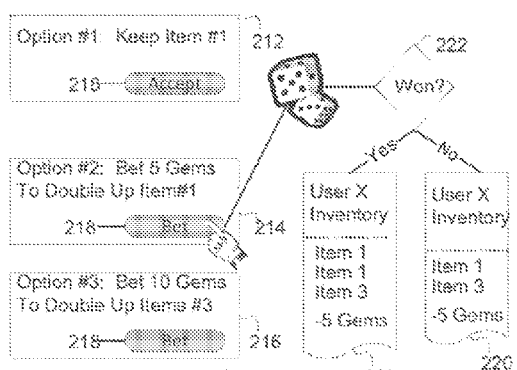
FIG. 2D illustrates an example of determining, stochastically, an outcome of a redetermination of initial payout of the instance of the virtual container activated in FIG. 2C.

FIG. 2D illustrates an example of determining, stochastically or quasi-stochastically, an outcome of the redetermination requested by the player. As shown in this example, the player accepts offer 214 to pay 5 gems in exchange to have item #1 in in the initial payout redetermined. As shown, responsive to the player selection of offer 214, a dice roll procedure may be invoked, for example by the distribution determination component 122 for a redetermination 222. As illustrated, in this example, if the player is determined to have achieved a favorable redetermination outcome, an item #2, which may be a "better" item (in terms of real value and/or perceived by the player), instead of item #1, may be included in the actual payout for delivery to the player's inventory. As also shown, if the player is determined to have not achieved a favorable outcome through the redetermination, an item 0, which may be an "inferior" item (in terms of real value and/or perceived by the player), instead of item #1, may be included in the actual payout for delivery to the player's inventory. As can be seen from this example, the 5 gems paid by the player for accepting offer 214 may be deducted from the player inventory 202 regardless of the redetermination outcome. This may present a monetization opportunity for the provider of the online game because the player may be willing to pay the amount of consideration for improving items initially determined for distribution of the instance of the virtual container activated by the player. It should be understood that the example illustrated in FIG. 2D is not intended to be limiting. Other configurations of the redetermination are contemplated. For example, in some implementations, the items in the initial payout may be doubled up (quantity) or lost as the result of the redetermination. For instance, the player may be offered to pay an amount of consideration in exchange for a chance to double up one or more items in the initial payout. In that instance, if the redetermination is in favor of the player, the player may have the one or more items in the initial payout doubled up, or if the redetermination is not in favor of the player, the player may lose the one or more items in the initial payout. This may simulate a "double or nothing" play.

The evaluation component 124 may be configured to evaluate an outcome of the redetermination as performed by the distribution determination component 122. The evaluation by the evaluation component 124 may involve determining values of the items distributed to players as the result of the redetermination. The values of the items may be evaluated by the evaluation component 124 based on their availability (or scarcity) in the game space; their price in a virtual store associated with the game space; their utility in the game space (e.g., the level of offensive power it provides, the level of defensive power it provides, the level of magic power it provides, and/or any other type of utility); and/or any other factors. For example, without limitation, the evaluation component 124 may determine whether the player has improved the initial payout through the redetermination.

Figure 2E:
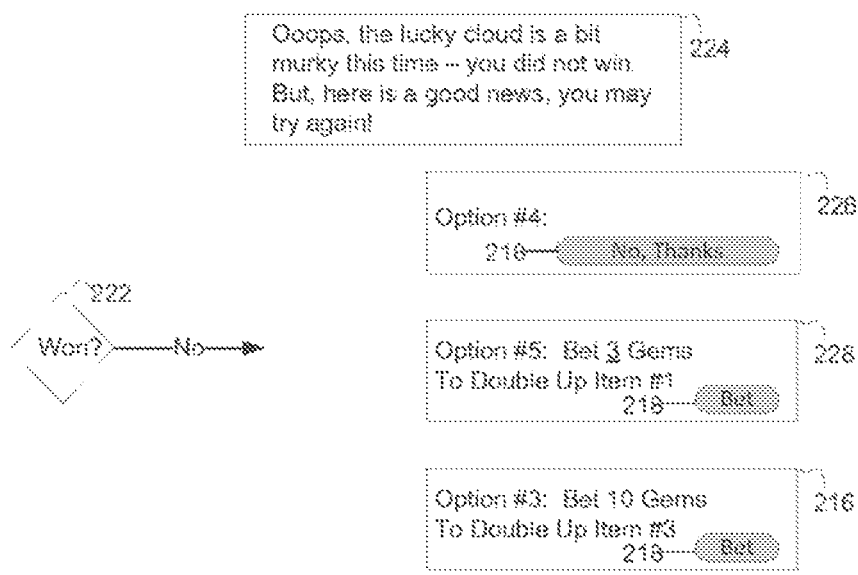
FIG. 2E illustrates one example of presenting offers to a player after it is determined that the player has not achieved a favorable redetermination outcome.

In some implementations, responsive to the determination that the player has not achieved a favorable redetermination outcome by the evaluation component 124, the offer component 120 may be configured to effectuate presentation of offers to the player for facilitating further player interactions with the activated instance of virtual container. FIG. 2E illustrates one example of presenting offers to a player after it is determined that the player has not achieved a favorable redetermination outcome. As shown in FIG. 2E, after it has been determined that the player has not achieved a favorable redetermination outcome by the determination 222 illustrated in FIG. 2D, a notification 224 may be presented to the player. As illustrated, the notification 224 may notify the player of the redetermination outcome—in this case that the player did not achieve a "better" payout. As also illustrated, the notification 224 may notify the player that the player may try again to improve the payouts of the activated instance of the virtual container 206. As can be seen from FIG. 2E, in association with the notification 224, offers such as offers 226, 228, and 216 may be presented. As illustrated, offer 226 may be presented to enable the player not to continue to interact with the instance of virtual container 206 so that the player may accept the outcome of the redetermination. As also illustrated, an offer 228 may be presented to the player to enable the player to try again. In this example, as shown, since the player did not achieve a "better" payout through offer 214 shown in FIG. 2D, offer 228 may be presented to enable the player to have item #2, which replaces item #1 as the result of redetermination, redetermined. In some implementations, the amount of consideration the player may be required to pay in exchange for repeating the previous redetermination may be less than that required for the previous redetermination. As illustrated in this example, in the previous redetermination shown in FIG. 2D, 5 gems are required for the player to accept "redetermination" offer 214, but only 3 gems are required for the player to try again as illustrated in FIG. 2E. In implementations, the amount or magnitude of the discount may be determined based on the value of the "redeterminable" item(s) as determined by the evaluation component 124. For example, without limitation, a bigger discount may be applied if the "redeterminable" item(s) has somewhat (or relative) low value in the game space; while a smaller (or no) discount may be applied if the "redeterminable" item(s) has somewhat (or relative) high value in the game space.

Returning to FIG. 1, the server 102, client computing platforms 104, and/or external resources 106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 106 may be operatively linked via some other communication media.

A given client computing platform 104 may include one or more processors configured to execute computer program components. The computer program components may be configured to enable an expert or player associated with the given client computing platform 104 to interface with system 100 and/or external resources 106, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

The external resources 106 may include sources of information, hosts and/or providers of virtual environments outside of system 100, external entities participating with system 100, and/or other resources. In some implementations, some or all of the functionality attributed herein to external resources 106 may be provided by resources included in system 100.

The server 102 may include electronic storage 110, one or more processors 108, and/or other components. The server 102 may include communication lines or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 110 may comprise electronic storage media that electronically stores information. The electronic storage media of electronic storage 110 may include one or both of system storage that is provided integrally (i.e., substantially non-removable) with server 102 and/or removable storage that is removably connectable to server 102 via, for example, a port (e.g., a USB port, a FireWire port, etc.) or a drive (e.g., a disk drive, etc.). Electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-slate storage media (e.g., flash drive, etc.), and/or other electronically readable storage media. The electronic storage 110 may include one or more virtual storage resources (e.g., cloud storage, a virtual private network, and/or other virtual storage resources). Electronic storage 110 may store software algorithms, information determined by processor 108, information received from server 102, information received from client computing platforms 104, and/or other information that enables server 102 to function as described herein.

Processor(s) 108 is configured to provide information processing capabilities in server 102. As such, processor 108 may include one or more of a digital processor, an analog processor, a digital circuit designed to process information, an analog circuit designed to process information, a state machine, and/or other mechanisms for electronically processing information. Although processor 108 is shown in FIG. 1 as a single entity, this is for illustrative purposes only. In some implementations, processor 108 may include a plurality of processing units. These processing units may be physically located within the same device, or processor 108 may represent processing functionality of a plurality of devices operating in coordination. The processor 108 may be configured to execute components 112, 114, 116, 118, 120, 122, and 124. Processor 108 may be configured to execute components 112, 114, 116, 118, 120, and 122, 124 by software; hardware; firmware; some combination of software, hardware, and/or firmware; and/or other mechanisms for configuring processing capabilities of processor 108.

It should be appreciated that although components 112, 114, 116, 118, 120, 122, 124 are illustrated in FIG. 1 as being co-located within a single processing unit, in implementations in which processor 108 includes multiple processing units, one or more of components 112, 114, 116, 118, 120, 122, 124 may be located remotely from the other components. The description of the functionality provided by the different components 112, 114, 116, 118, 120, 122, 124 described below is for illustrative purposes, and is not intended to be limiting, as any of components 112, 114, 116, 118, 120, 122, 124 may provide more or less functionality than is described. For example, one or more of components 112, 114, 116, 118, 120, 122, 124 may be eliminated, and some or ail of its functionality may be provided by other ones of components 112, 114, 116, 118, 120, 122, 124. As another example, processor 108 may be configured to execute one or more additional components that may perform some or all of the functionality attributed below to one of components 112, 114, 116, 118, 120, 122, 124.

Figure 3:
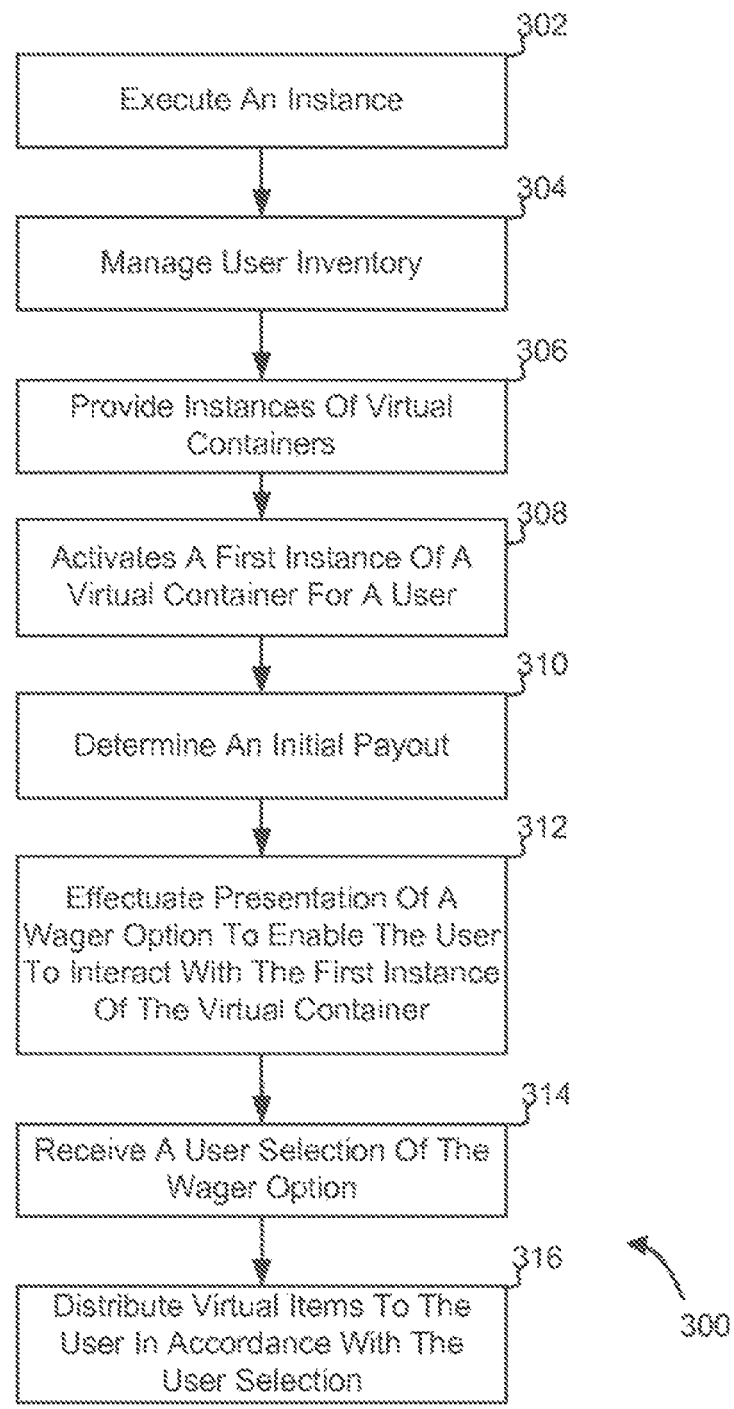
FIG. 3 illustrates one exemplary method for facilitating player interaction with an instance of a virtual container in accordance with the disclosure.

FIG. 3 illustrates one exemplary method 300 for facilitating player interaction with an instance of virtual container in accordance with the disclosure. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, an instance of an online game may be hosted. In some implementations, operation 302 may be performed by a game component the same as or similar to game component 112 (shown in FIG. 1 and described herein).

At an operation 304, player inventory may be managed for the players of the online game hosted in operation 302. In some implementations, operation 302 may be performed by an inventory component the same as or similar to inventory component 114 (shown in FIG. 1 and described herein).

At an operation 306, instances of virtual containers may be provided in the online game hosted in operation 302. The instances of virtual containers provided in operation 306 may be used for distributing virtual items stochastically or quasi-stochastically to the players of the online game. Examples of virtual containers that may be provided in operation 306 may include treasure boxes, treasure troves, combat boxes, war chests, lucky boxes, resource boxes, resource chests, mystery boxes, mystery chests, random boxes, and/or any other type(s) of virtual container(s). As such, a given instance of virtual container may be associated with a set of potential items such that upon player activation of the instance of the given virtual container, one or more items in the set of potential items may be distributed to the player inventory stochastically or quasi-stochastically. The individual one or more items in the set of potential items associated with the given instance of virtual container may be associated with corresponding distribution probabilities for distribution to the players. In some implementations, operation 306 may be performed by a virtual container component the same as or similar to virtual container component 116 (shown in FIG. 1 and described herein).

At an operation 308, a first instance of a virtual container may be activated for the first player in the online game. In some implementations, operation 308 may be performed by activation component the same as or similar to activation component 118 (shown in FIG. 1 and described herein).

At an operation 310, one or more items in the sets of the potential items associated with the first instance of virtual container may be determined, stochastically or quasi-stochastically, as the initial payout for distribution to the player in accordance with the distribution probability corresponding to the individual items in the set of potential items associated with the first instance of virtual container. In some implementations, operation 310 may be performed by an activation component the same as or similar to activation component 118 (shown in FIG. 1 and described herein).

At an operation 312. presentation of offers to enable the player to interact with the first instance of virtual container may be effectuated. The offers may include an "even" offer that specifies that the player may accept the initial payout determined in operation 310, one or more "redetermination" offers specifying that the player may have the initial payout redetermined to improve the initial payout, and/or any other offers. The given "redetermination" offer may specify an amount of consideration that the player must pay in order to have the redetermination of the initial payout performed as specified by the "redetermination" offer. A configuration of the given "redetermination" offer may include a probability for an outcome of a favorable redetermination offer, designation of one or more items in the payout that may be redetermined, terms for wins or losses, and/or any other configuration for the "redetermination" offer. In some implementations, operation 312 may be performed by an offer component the same as or similar to offer component 120 (shown in FIG. 1 and described herein).

At an operation 314, a player acceptance of an offer presented in operation 312 may be received. In some implementations, operation 314 may be performed by a distribution determination component the same as or similar to distribution determination component 122 (shown in FIG. 1 and described herein).

At an operation 316, virtual items may be distributed to the player in accordance with the player selection received in operation 314. Distribution of the items in operation 316 may involve obtaining the configuration of the "redetermination" offer accepted by the player in operation 314, redetermining the initial payout in accordance with the probability specified in the configuration of the received "redetermination" offer, distributing the items in accordance with the outcome of the redetermination, and/or any other operations. In some implementations, operation 316 may be performed by a distribution determination component the same as or similar to distribution determination component 122 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for facilitating player interaction with virtual containers in an online game, the system comprising:
   one or more physical processors configured by machine-readable instructions to:
   host the online game, wherein hosting the online games comprises managing player inventories of virtual items associated with individual players in the online game, the managed player inventories including a first player inventory associated with a first player of the on line game;
   provide instances of virtual containers for player interaction in the online game, the instances of the virtual containers being associated with corresponding sets of potential items such that a first instance of a first virtual container is provided to the first player for interaction and is associated with a first set of potential items, wherein the individual potential items in the first set are associated with corresponding distribution probabilities for distribution to the first player inventory;
   receive from players activation requests for activating instances of virtual containers and responsive to such activation requests, determine which one or ones of the potential items will be distributed to the players in accordance with the distribution probabilities corresponding to the potential items associated with the requested instances of the virtual containers such that responsive to an activation request from the first player for activating the first instance of the first virtual container, one or more items in the first set of potential items are determined to be distributed to the first player inventory in accordance with the distribution probabilities corresponding to the individual potential items in the first set;
   responsive to the determination of the one or more items in the first set of potential items to be distributed to the first player inventory as an initial payout, effectuate presentation of an offer for redetermining one or more items in the initial payout, wherein the offer specifies that the first player may pay a first amount of consideration in exchange for having the one or more items in the initial payout redetermined, wherein the first amount of consideration includes value in addition to any value that the one or more items in the initial payout have; and
   responsive to the first player accepting the offer, redetermine, stochastically or quasi-stochastically, the one or more items in the initial payout to determine an actual payout; and
   distribute the initial payout and/or the actual payout to the first player inventory based on whether or not the first player accepts the offer and/or an outcome of the redetermination.

2. The system of claim 1, wherein the outcome of the redetermination is increasing the quantity of the one or more items in the initial payout to be distributed to the first player inventory.

3. The system of claim 1, wherein the outcome of the redetermination is reducing the quantity of the one or more items in the initial payout to be distributed to the first player inventory.

4. The system of claim 2, wherein the one or more physical processors are further configured to return the first amount of consideration to the first player if the outcome of the redetermination indicates the quantity of the one or more items in the initial payout to be distributed to the first player inventory is increased.

5. The system of claim 1, wherein the one or more physical processors are further configured such that if the redetermination outcome reduces the quantity of the one or more items in the initial payout and/or the value that the one or more items in the initial payout have presentation of a third offer and fourth offer on the client computing platform associated with the first player is effectuated, wherein the third offer specifies that the first player may accept the redetermination outcome, and the fourth offer specifies that the first player may pay a second amount of consideration in exchange for continuing to have the one or more items in the initial payout redetermined.

6. The system of claim 5, wherein the second amount of consideration is less than or equal to the first amount of consideration.

7. The system of claim 5, wherein the difference between the second amount of consideration and the first amount of consideration is proportional to the value of the one or more items in the initial payout.

8. The system of claim 1, wherein the one or more physical processors are further configured to evaluate the value of the items to be distributed to the player after the stochastic or quasi-stochastic redetermination.

9. A method for facilitating player interaction with virtual containers in an online game, the method being implemented in one or more physical processors configured to execute computer programs, the method comprising:

hosting the online game, wherein hosting the online games comprises managing player inventories of virtual items associated with individual players in the online game, the managed player inventories including a first player inventory associated with a first player of the on line game;

providing instances of virtual containers for player interaction in the on line game, the instances of the virtual containers being associated with corresponding sets of potential items such that a first instance of a first virtual container is provided to the first player for interaction and is associated with a first set of potential items, wherein the individual potential items in the first set are associated with corresponding distribution probabilities for distribution to the first player inventory;

receiving from players activation requests for activating instances of virtual containers and responsive to such activation requests, determine which one or ones of the potential items will be distributed to the players as initial payouts in accordance with the distribution probabilities corresponding to the potential items associated with the requested instances of the virtual containers such that in responsive to an activation request from the first player for activating the first instance of the first virtual container, one or more items in the first set of potential items are determined to be distributed to the first player inventory in accordance with the distribution probabilities corresponding to the individual potential items in the first set;

responsive to the determination of the one or more items in the first set of virtual items to be distributed to the first player inventory, effectuating presentation of an offer for redetermining the one or more items in the first set of virtual items to be distributed to the first player inventory as an initial payout, wherein the offer specifies that the first player may pay a first amount of consideration in exchange for having the determined one or more items in the initial payout redetermined, wherein the first amount of consideration includes value in addition to any value that the one or more items in the initial payout have; and responsive to the first player accepting the offer, redetermining, stochastically or quasi-stochastically, the one or more items in the initial payout to determine an actual payout; and distribute the initial payout and/or the actual payout to the first player inventory based on whether or not the first player accepts the offer and/or an outcome of the redetermination.

10. The method of claim 9, wherein the outcome of the redetermination is increasing the quantity of the one or more items in the initial payout to be distributed to the first player inventory.

11. The method of claim 9, wherein the outcome of the redetermination is reducing the quantity of the one or more items in the initial payout to be distributed to the first player inventory.

12. The method of claim 10, further comprising returning the first amount of consideration to the first player if the outcome of the redetermination indicates the quantity of the one or more items in the initial payout to be distributed to the first player inventory is increased.

13. The method of claim 9, further comprising if the redetermination outcome reduces the quantity of the one or more items in the initial payout and/or the value that the one or more items in the initial payout have, effectuating presentation of a third offer and fourth offer on the client computing platform associated with the first player, wherein the third offer specifies that the first player may accept the redetermination outcome, and the fourth offer specifies that the first player may pay a second amount of consideration in exchange for continuing to have the one or more items in the initial payout redetermined.

14. The method of claim 13, wherein the second amount of consideration is less than or equal to the first amount of consideration.

15. The method of claim 13, wherein the difference between the second amount of consideration and the first amount of consideration is proportional to the value of the determined one or more items.

16. The method of claim 10, further comprising evaluating the value of the items to be distributed to the player after the stochastic or quasi-stochastic determination.

* * * * *

UNITED STATES PATENT AND TRADEMARK OFFICE
CERTIFICATE OF CORRECTION

PATENT NO. : 9,931,570 B1
APPLICATION NO. : 15/406225
DATED : April 3, 2018
INVENTOR(S) : Christopher Yu Page 1 of 2

It is certified that error appears in the above-identified patent and that said Letters Patent is hereby corrected as shown below:

On the Title Page

Column 2, Item (56) Line 13, Change "streettighter." to --streetfighter.--.

Item (57) Line 7, Change "redetermined" to --redetermination--.

Item (57) Line 14, Change "effectuated" to --effectuated in--.

Column 2, page 5, Item (56) Line 27, Change "hftp:" to --http:--.

Column 2, page 5, Item (56) Line 69, Change "bundlest," to --bundles/,--.

In the Specification

Column 1 Line 9, Change "combat," to --combat--.

Column 1 Line 53, Change "The" to --the--.

Column 7 Line 66, Change "stale" to --state--.

Column 8 Line 63, Change "etc.)." to --etc.),--.

Column 9 Line 20, Change "etc.)." to --etc.),--.

Column 13 Line 33, Change "difficult," to --difficult.--.

Column 13 Line 37, Change "of" to --if--.

Column 13 Line 63, Change "2C." to --2C,--.

Signed and Sealed this
Eighteenth Day of September, 2018

Andrei Iancu
*Director of the United States Patent and Trademark Office*

Column 17 Line 29, Change "solid-slate" to --solid-state--.

Column 18 Line 4, Change "ail" to --all--.

Column 19 Line 13, Change "312." to --312,--.

In the Claims

Column 21 Line 1, Claim 5, change "have" to --have,--.